(12) United States Patent
Smith et al.

(10) Patent No.: US 10,288,816 B2
(45) Date of Patent: May 14, 2019

(54) HYBRID CONNECTORS

(71) Applicant: 3M INNOVATIVE PROPERTIES COMPANY, St. Paul, MN (US)

(72) Inventors: Terry L. Smith, Roseville, MN (US); Michael A. Haase, St. Paul, MN (US); James M. Nelson, Lino Lakes, MN (US); Alexander R. Mathews, Austin, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/763,136

(22) PCT Filed: Oct. 3, 2016

(86) PCT No.: PCT/US2016/055117
§ 371 (c)(1),
(2) Date: Mar. 26, 2018

(87) PCT Pub. No.: WO2017/066019
PCT Pub. Date: Apr. 20, 2017

(65) Prior Publication Data
US 2018/0284354 A1 Oct. 4, 2018

Related U.S. Application Data

(60) Provisional application No. 62/240,005, filed on Oct. 12, 2015.

(51) Int. Cl.
*G02B 6/38* (2006.01)
*H01R 12/91* (2011.01)
(Continued)

(52) U.S. Cl.
CPC ........ *G02B 6/3817* (2013.01); *G02B 6/3839* (2013.01); *G02B 6/3878* (2013.01);
(Continued)

(58) Field of Classification Search
CPC .. G02B 6/3817; G02B 6/3885; G02B 6/3839; G02B 6/3878; G02B 6/3887;
(Continued)

(56) References Cited

U.S. PATENT DOCUMENTS 8,974,126 B2 3/2015 Sloey et al.
10,001,615 B2 * 6/2018 Armistead ....... H01R 13/62933
(Continued)

FOREIGN PATENT DOCUMENTS

EP 1 179 745 2/2002
WO WO 2013/162550 10/2013
WO WO 2015/142551 9/2015

OTHER PUBLICATIONS

PCT International Search Report from PCT/US2016/055117, dated Jan. 2, 2017, 5 pages.

*Primary Examiner* — Ellen E Kim
(74) *Attorney, Agent, or Firm* — Jonathan L. Tolstedt

(57) ABSTRACT

A hybrid connector includes a connector housing, one or more first connection elements configured to transfer a first type of energy or a fluid, and one or more second connection elements configured to transfer a second type of energy, different from the first type of energy, or the fluid. The first connection elements are rotationally fixed and the second connection elements are configured to rotate around an axis that is substantially perpendicular to a mating axis of the housing.

20 Claims, 33 Drawing Sheets

(51) Int. Cl.
*H01R 13/00* (2006.01)
*H01R 13/631* (2006.01)
*H01R 24/28* (2011.01)
*H01R 107/00* (2006.01)

(52) U.S. Cl.
CPC ......... *G02B 6/3885* (2013.01); *G02B 6/3887* (2013.01); *H01R 12/91* (2013.01); *H01R 13/005* (2013.01); *H01R 13/6315* (2013.01); *H01R 24/28* (2013.01); *G02B 6/3853* (2013.01); *H01R 2107/00* (2013.01)

(58) Field of Classification Search
CPC .. H01R 24/28; H01R 13/6315; H01R 13/005; H01R 2107/00
See application file for complete search history.

(56) References Cited

U.S. PATENT DOCUMENTS

| | | | |
|---|---|---|---|
| 10,162,140 B2* | 12/2018 | Smith | G02B 6/4292 |
| 2004/0028342 A1 | 2/2004 | Jones et al. | |
| 2006/0128196 A1* | 6/2006 | McKinnon | G02B 6/3816 |
| | | | 439/201 |
| 2009/0080837 A1* | 3/2009 | Baxter | G02B 6/3816 |
| | | | 385/56 |
| 2013/0129284 A1* | 5/2013 | Torikai | G02B 6/3817 |
| | | | 385/75 |
| 2013/0259428 A1* | 10/2013 | Isenhour | G02B 6/3817 |
| | | | 385/78 |
| 2015/0234127 A1 | 8/2015 | Paul Chen et al. | |
| 2018/0342926 A1* | 11/2018 | Inuzuka | H02K 37/04 |

\* cited by examiner

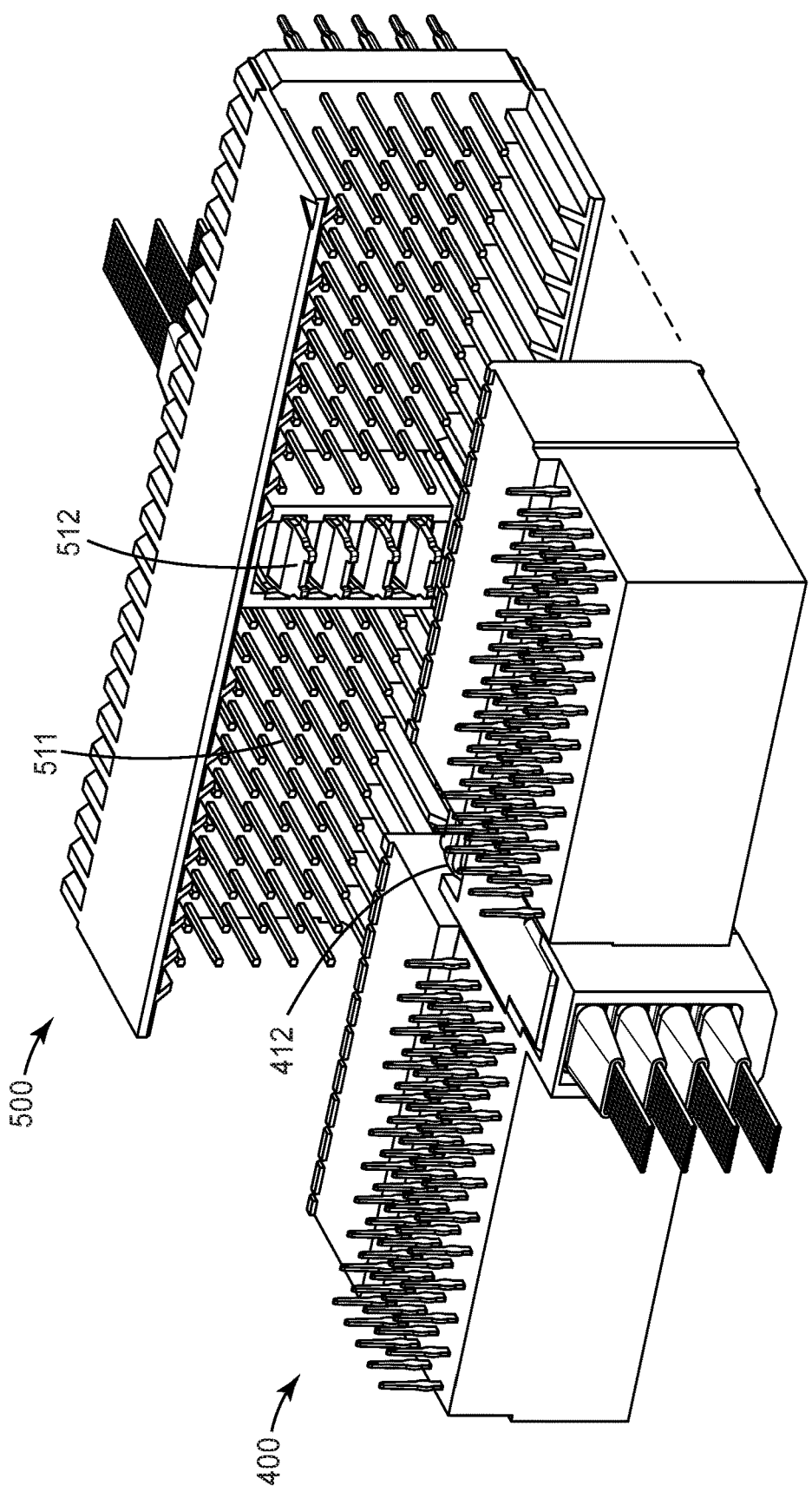

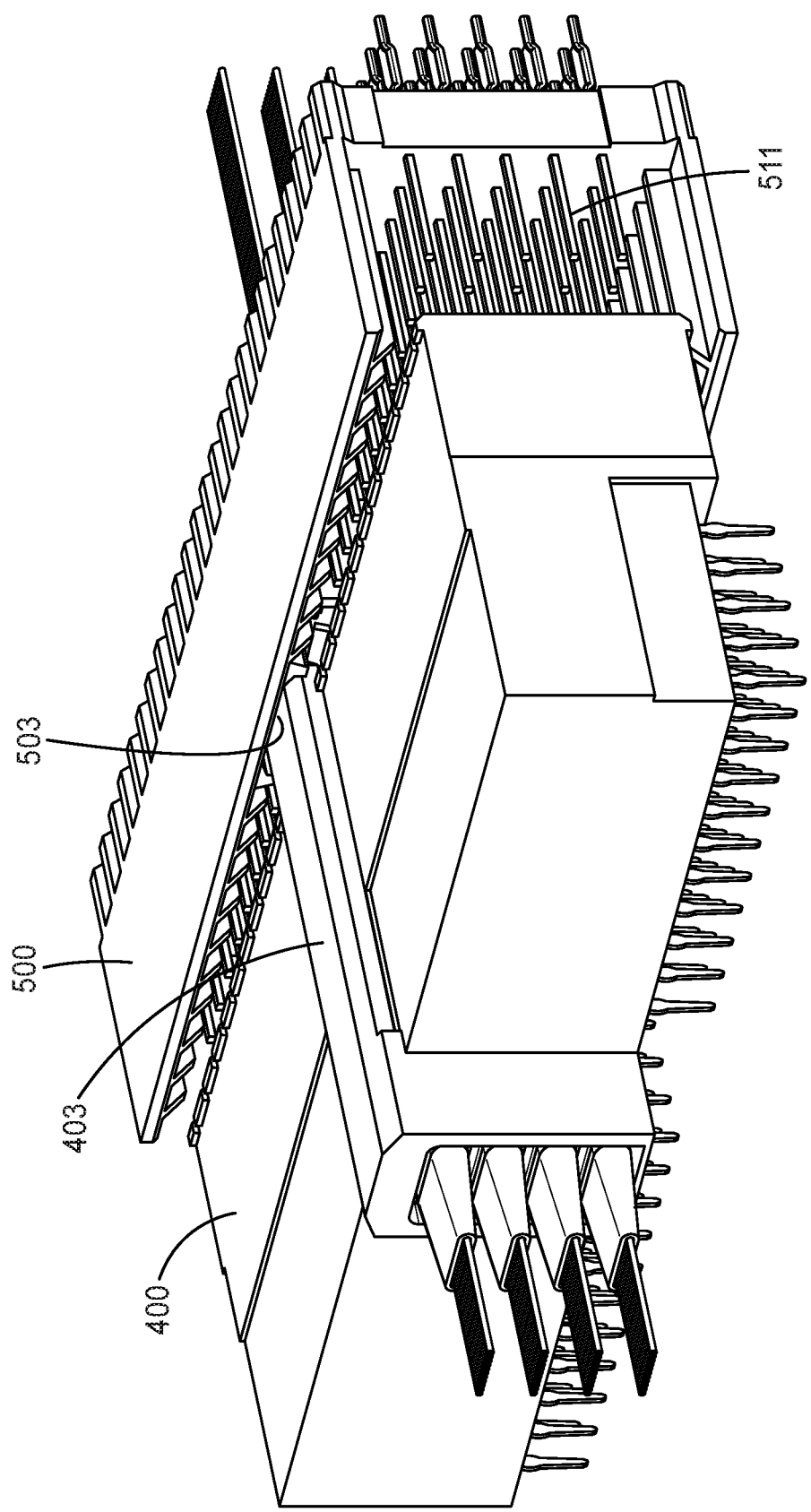

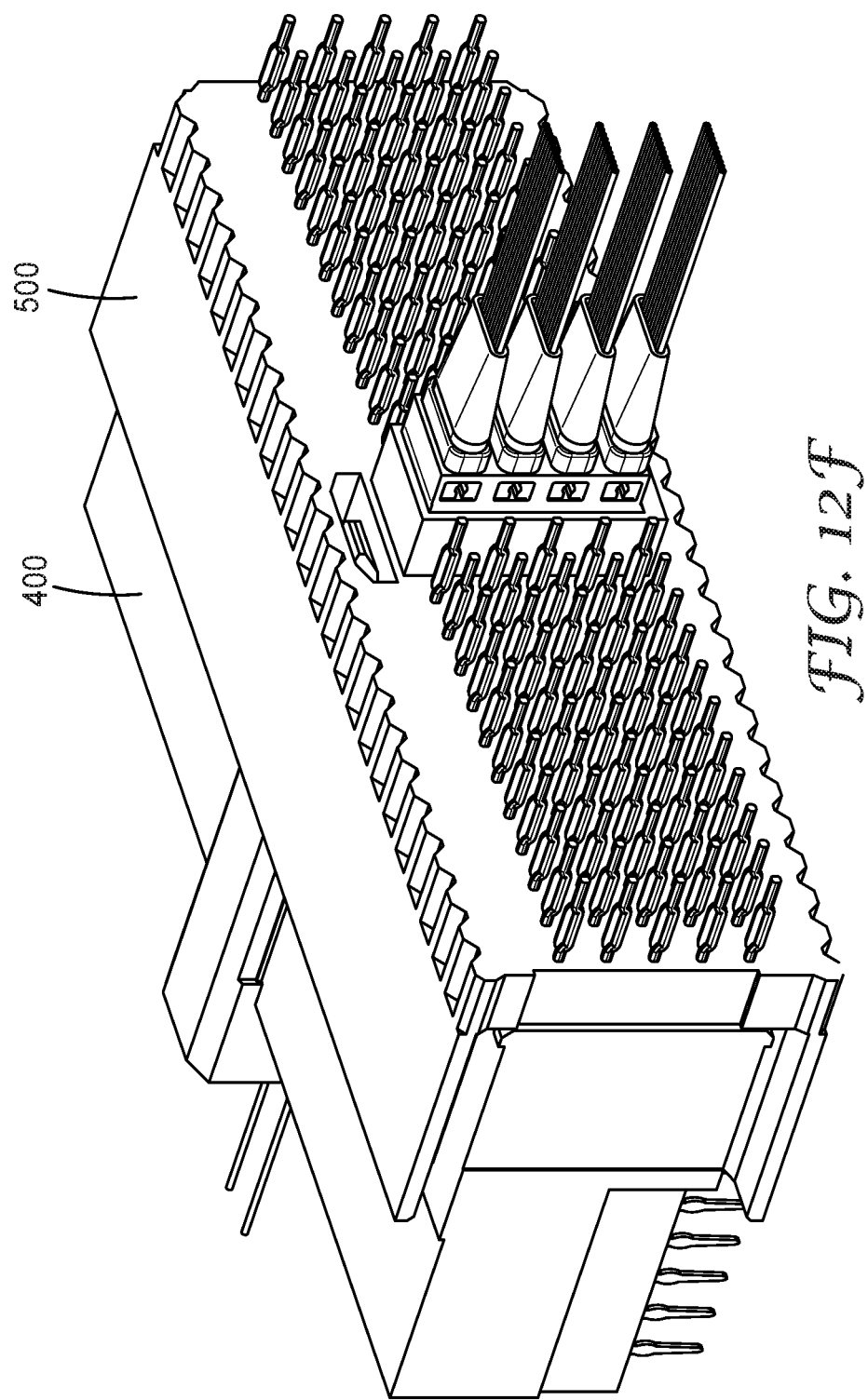

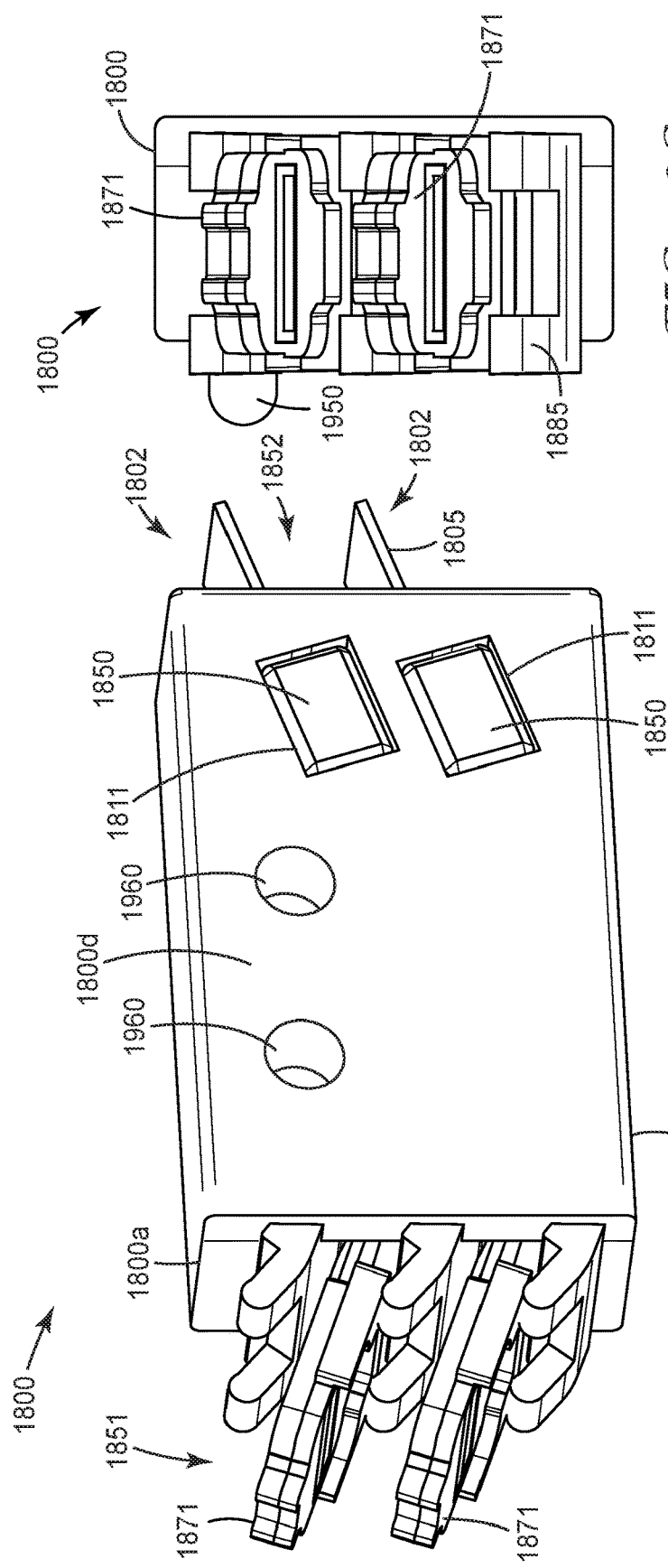

HYBRID CONNECTORS

TECHNICAL FIELD

This disclosure relates generally to electrical, optical, and/or fluidic hybrid connectors.

BACKGROUND

Optical connectors are used in a variety of applications including telecommunications networks, local area networks, data center links, and internal links in computer devices. Optical communication signals carried by optical waveguides can be used along with electrical communication signals carried by electrical conductors. When optical signals are used for communication, there is often a need to also make electrical power and/or ground connections between circuit boards or modules. Additionally, when optical signals are used in power-dense computing systems, there is often a need to provide connections for liquid coolant. The use of hybrid connectors capable of transferring both optical and electrical energy can simplify connectivity in some applications.

BRIEF SUMMARY

Some embodiments involve a hybrid connector that includes a connector housing, one or more first connection elements configured to transfer a first type of energy or a fluid, and one or more second connection elements configured to transfer a second type of energy, different from the first type of energy, or the fluid. The first connection elements are rotationally fixed and the second connection elements are configured to rotate around an axis that is substantially perpendicular to a mating axis of the housing.

According to some embodiments, a hybrid connector includes a housing, one or more first connection elements disposed at least partially within the housing and configured to transfer a first type of energy or a fluid, and one or more second connection elements disposed at least partially within the housing and configured to transfer a second type of energy different from the first type of energy or the fluid. The first connection elements are rotationally fixed in the housing and the second connection elements are configured to rotate around an axis that is substantially perpendicular to a mating axis of the housing. The first connection elements are configured to engage with corresponding first connection elements of a mating connector before the second connection elements engage with corresponding second connection elements of the mating connector. Engagement of the first connection elements with the corresponding first connection elements provides one of both of lateral and vertical alignment for engagement of the second connection elements.

In some embodiments, a hybrid connector includes a housing that includes a passageway, one or more first connection elements, each first connection element rotationally fixed and configured for attachment to a first energy conductor, one or more second connection elements, each second connection element configured to rotate, each second connection element supported by and attached to one or more second energy conductors at a first attachment area, one or more cable retainers comprising a second attachment area for attaching to the second energy conductors, and a retainer mount disposed within the housing and configured to engage with the cable retainer such that a position of second attachment area is fixed within the housing. The passageway is dimensioned to constrain the second energy conductors to bend within the housing between the first attachment area and the second attachment area.

According to some embodiments, a modular hybrid connector comprises a plurality of modules including at least a first module and a second module. The first module includes a first module housing that includes module connecting elements configured to connect the first module with a neighboring second module and first connection elements rotationally fixed and at least partially disposed within the first module housing. The first connection elements are configured to transfer a first type of energy or a fluid to a mating connector. The second module comprises a second module housing that includes module connecting elements configured to engage with the modular connecting features of the first module housing and second connection elements at least partially disposed within the first module housing. The second connection elements are configured to rotate around an axis perpendicular to a mating axis of the hybrid connector. The second connection elements are configured to transfer a second type of energy, different from the first type of energy, or the fluid to the mating connector.

BRIEF DESCRIPTION OF DRAWINGS

FIGS. 12A through 12F illustrate the connector of FIGS. 4A through 4D and the connector of FIGS. 5A through 5D before, during, and after mating;

FIGS. 18A through 18E illustrate a housing portion having partial sidewalls that expose curved passageways in accordance with some embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Embodiments disclosed herein relate to hybrid connectors capable of transferring energy and/or fluid. For example, in some embodiments, a hybrid connector may transfer two or more of electricity, light, and fluid. In one scenario, a hybrid connector facilitates the transfer of electrical signals and optical signals. In another scenario, a hybrid connector facilitates the transfer of optical signals and also provides electrical voltage and ground connections that provide power and ground for optoelectronic components that receive the optical signals. In yet another scenario, a hybrid connector facilitates the transfer of electrical signals, optical signals, and a coolant fluid used to cool electronic and/or optoelectronic components.

Figure 1A:
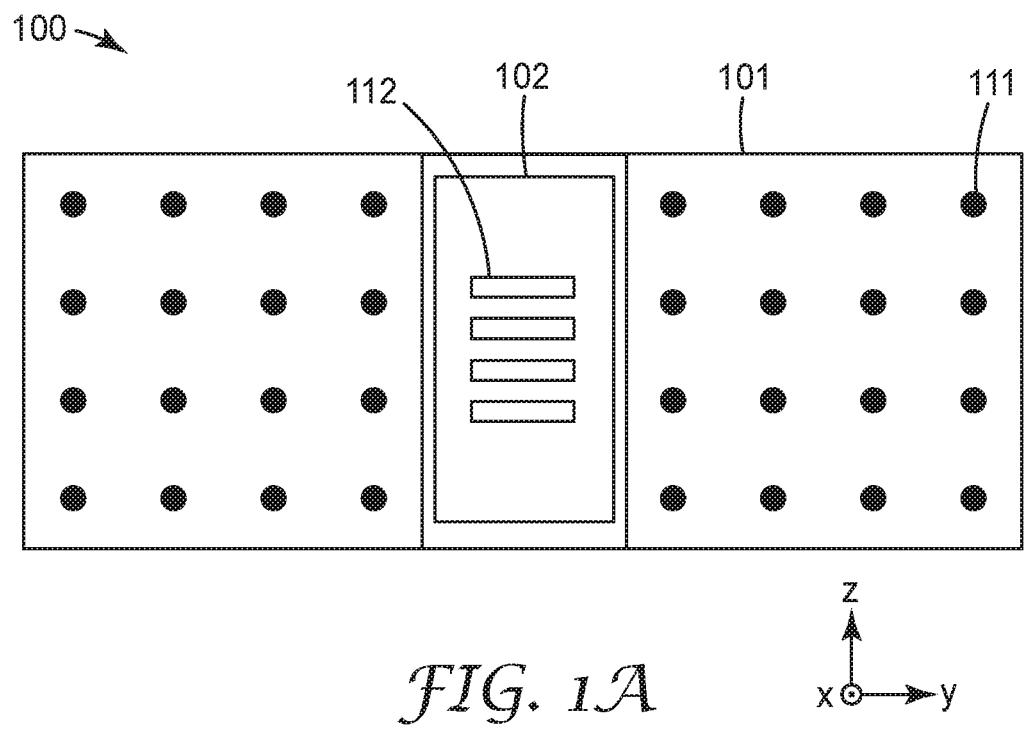
FIG. 1A provides a view looking into a hybrid connector in accordance with some embodiments.
Figure 1B:
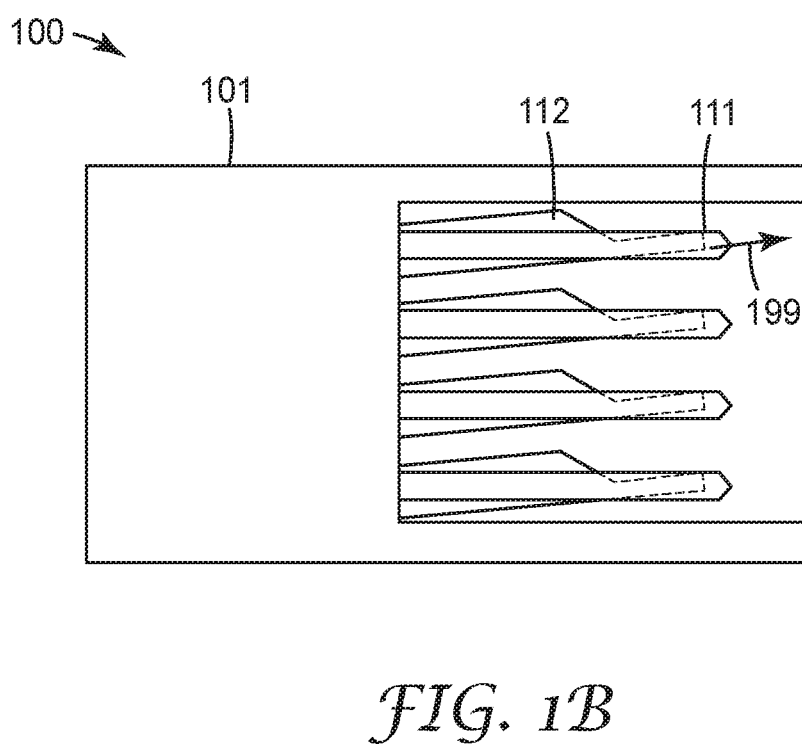
FIG. 1B is a side view of the hybrid connector of FIG. 1A.

FIG. 1A is a view looking into a hybrid connector 100 and FIG. 1B is a side view of the hybrid connector 100 in accordance with some embodiments. The hybrid connector 100 includes a housing 101, one or more first connection elements, and one or more second connection elements. The one or more first connection elements 111 are disposed at least partially within the housing 101 and are configured to transfer a first type of energy or a fluid. The one or more second connection elements 112 may also be disposed at least partially within the housing 101 and are configured to transfer a second type of energy or the fluid, the second type of energy being different from the first type of energy. In some embodiments, one or more of the first 111 and the second 112 connection elements are configured to rotate at least a few degrees around one of the axes y, z which are substantially perpendicular to a mating axis, x, of the connector housing 101.

The examples provided herein illustrate hybrid connectors using connection elements that transfer electrical energy and optical energy. It will be appreciated that hybrid connectors as described herein could alternatively transfer electrical energy and fluid, optical energy and fluid, or electrical energy, optical energy, and fluid, etc.

In FIGS. 1A and 1B, the first connection elements 111 are represented as electrically conductive pins configured to transfer electrical energy between the connector 100 and a mating connector. The second connection elements 112 are represented as optical ferrules configured to transfer light energy between the connector 100 and the mating connector. In this example, the electrical connection elements 111 are rotationally fixed within the housing 101 and the optical ferrules 112 are configured to at least partially rotate around the y axis, e.g., such that the longitudinal axis of the ferrules, indicated by arrow 199, makes an angle, θ, with respect to the x axis. Optionally, optical ferrules 112 may be disposed within a housing that is separate from and mechanically connected to the housing of the electrical contacts 111. Optionally, the optical ferrules 112 are disposed within an inner housing 102 that is configured to fit at least partially within the outer housing 101. FIG. 1A shows the optical ferrules disposed within an optional inner housing 102.

Figure 2:
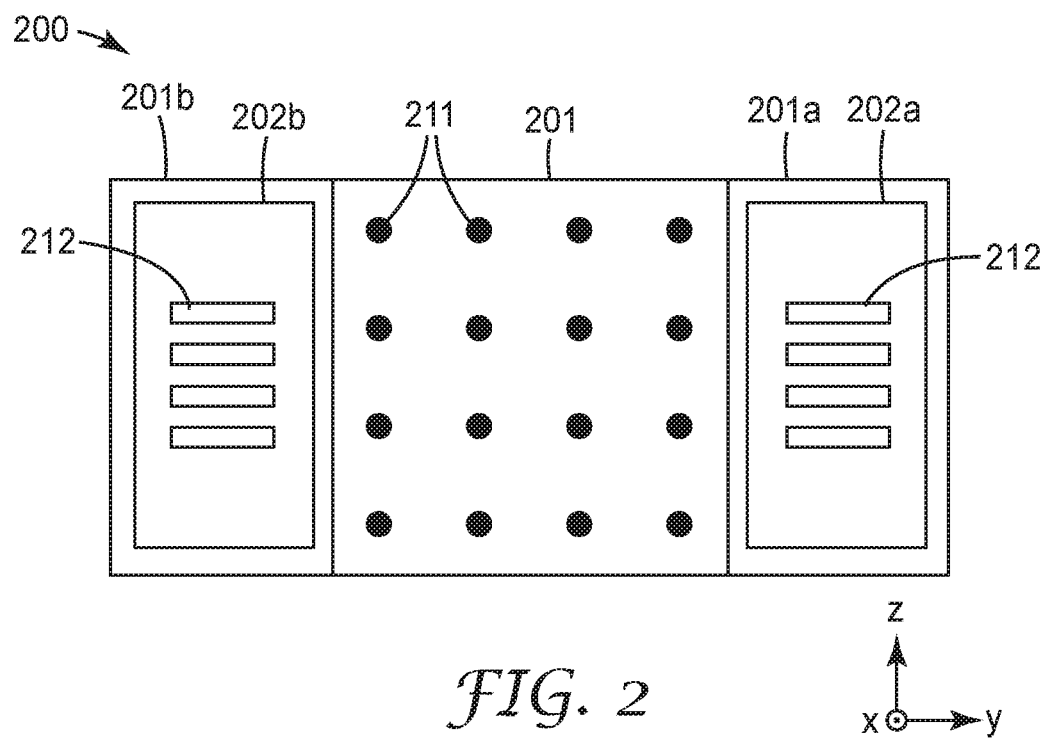
FIGS. 2 and 3 illustrate two configurations of hybrid connectors capable of transferring different types of energy or energy and fluid in accordance with some embodiments.
Figure 3:
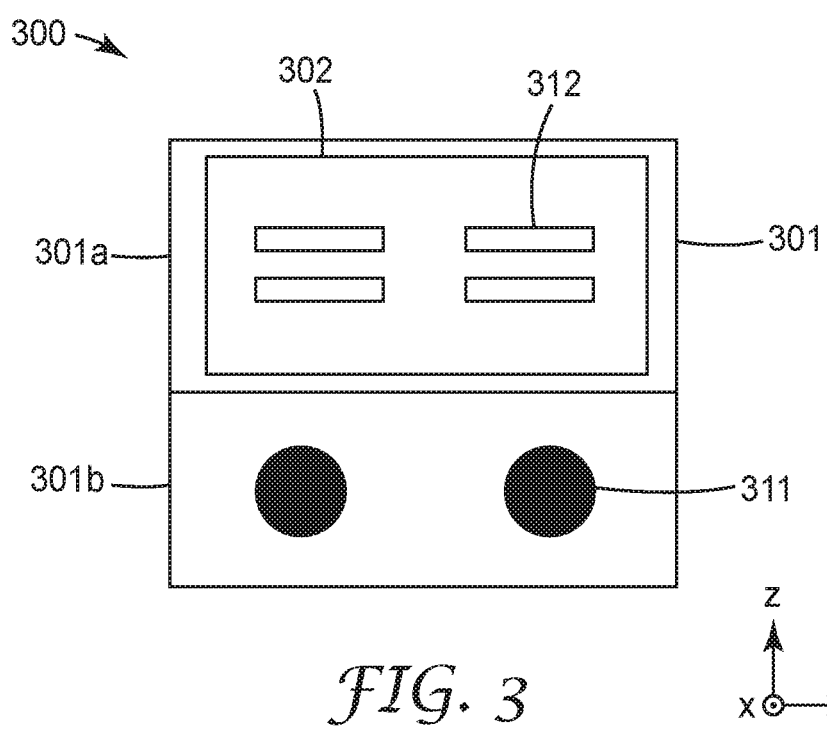

FIGS. 2 and 3 illustrate two of many different configurations for hybrid connectors. FIGS. 2 and 3 illustrate hybrid connectors 200, 300 with views looking into the hybrid connectors 200, 300 along the mating (x-) axis. Connectors 200, 300 include first connection elements 211, 311, illustrated as rotationally fixed electrically conductive contacts disposed within a housing 201, 301. The electrically conductive contacts 211, 311 may carry electrical signals and/or may carry electrical power and ground connections. Connectors 200, 300 include second connection elements illustrated as optical ferrules 212, 312 that can rotate at least partially around the y axis. The rotation of optical ferrules 212, 312 can be configured to facilitate mating with optical ferrules of a mating connector, for example. Hybrid connector 200 includes two sections 201a, 201b of optical ferrules 212, with the electrical contacts 211 disposed between sections 201a, 201b of the optical ferrules 212. Hybrid connector 300 includes a section of electrical contacts 311 disposed below the optical ferrules 312 along the z axis. Optionally, the optical ferrules 212, 312 may be disposed within the same housing as the electrical contacts 211, 311, or in a housing that is separate from and mechanically connected to the housing of the electrical contacts 211, 311. FIGS. 2 and 3 show the optical ferrules 212, 312 disposed within optional inner housing(s) 202a, 202b, 302. In some embodiments, as illustrated by FIG. 3, the hybrid connector 300 includes rotatable optical ferrules 312 in a first section 301a of the housing 301 and rotationally fixed electrical power connections 311, e.g., power and ground electrical connections, in a second section 301b of the housing 301.

Figure 4A:
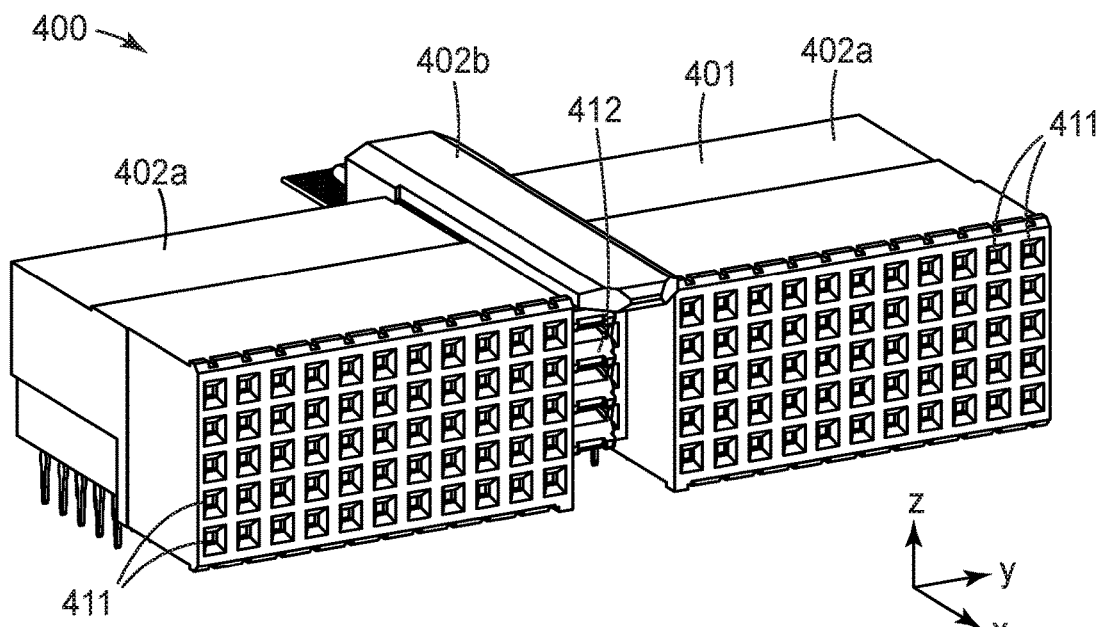
FIGS. 4A through 4D show various views of a right angle hybrid connector in accordance with some embodiments.
Figure 4B:
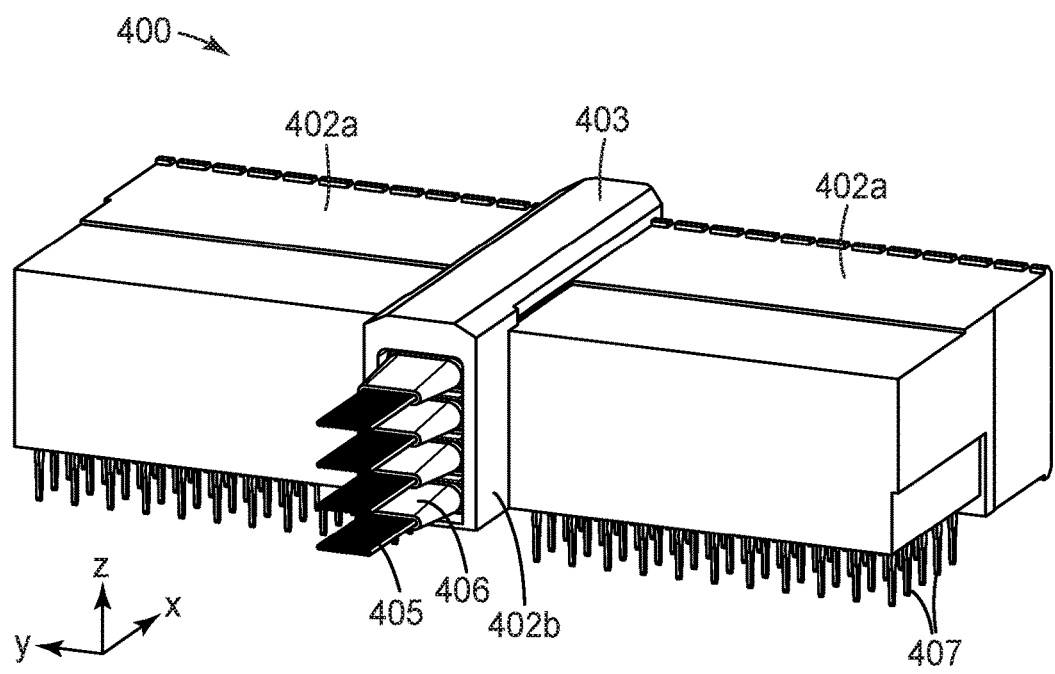
Figure 4C:
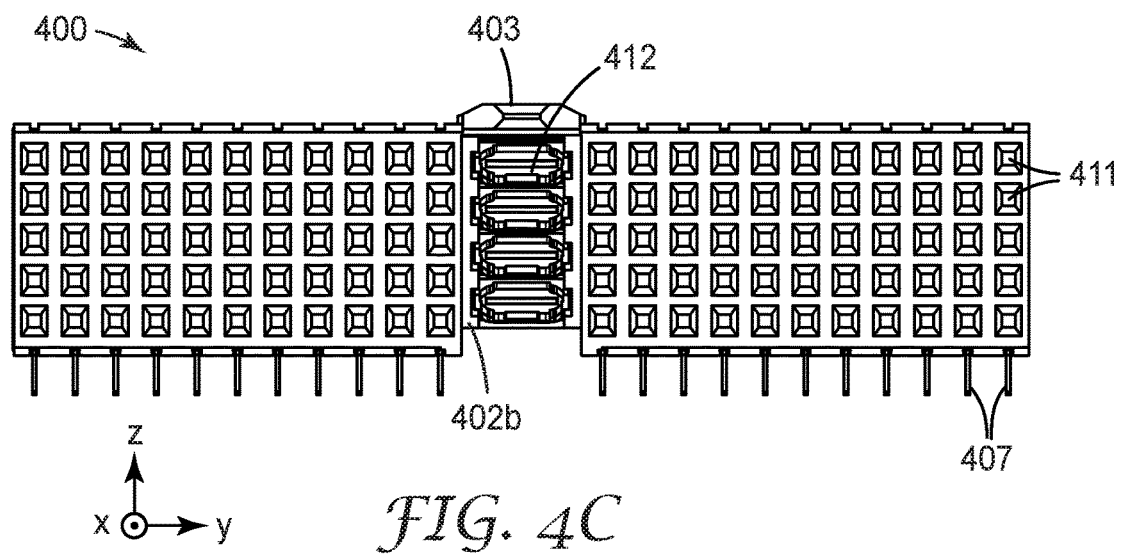
Figure 4D:
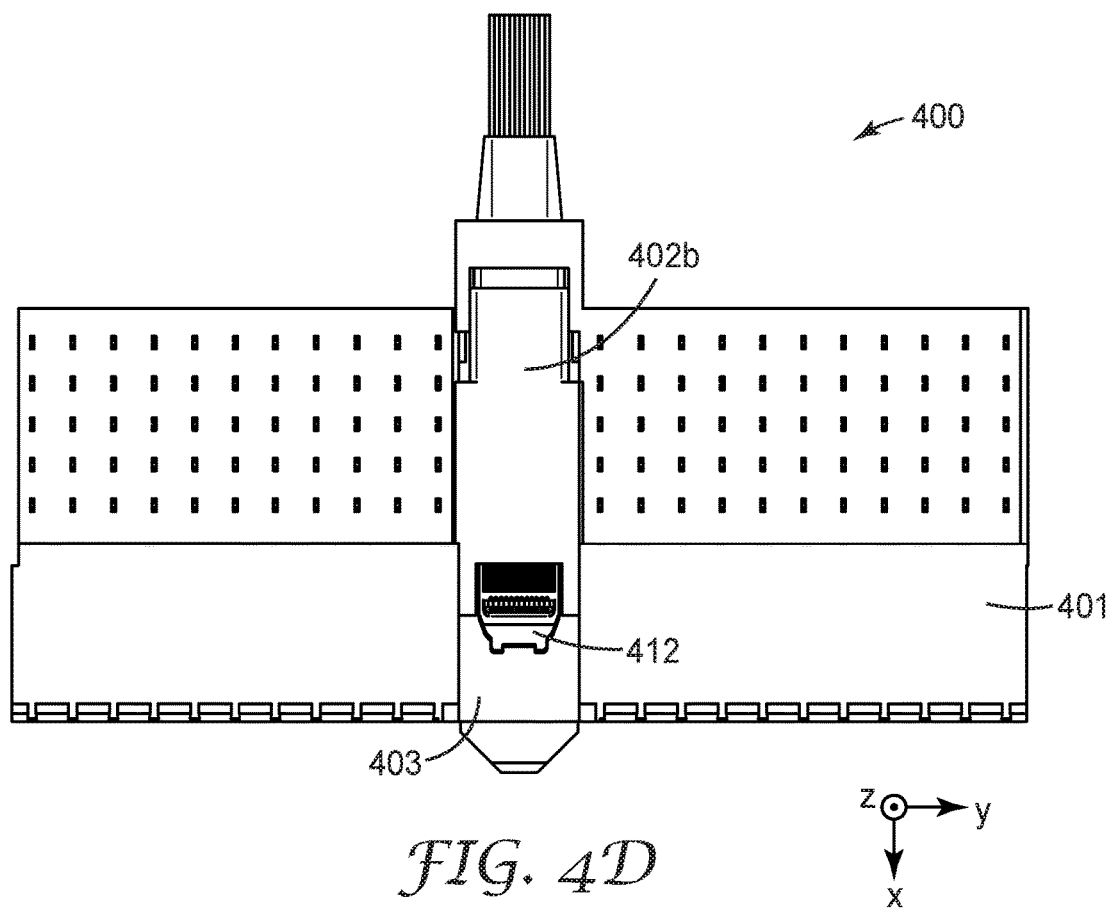

FIGS. 4A through 4D show various views of a right angle hybrid connector suitable for mounting on a printed circuit board or backplane. FIGS. 4A and 4B show front and rear perspective views of the hybrid connector 400. FIG. 4C shows a view looking into the connector 400 along the mating (x-) axis. FIG. 4D shows a top cutaway view of the connector 400 showing a portion of the inner housing 402. Connector 400 includes electrical socket contacts 411 that are configured to mate with electrical contacts of a mating connector. The electrical contacts 411 are rotationally fixed within the housing 401. The socket contacts 411 may also be translationally fixed within the housing 401. The electrical contacts 411 are electrically coupled to solder contacts 407 suitable for soldering to a printed circuit board, for example.

Connector 400 includes optical ferrules 412 that are free to rotate partially around the y axis, orthogonal to the mating axis, x. The optical ferrules 412 are attached to multiple waveguides 405 that extend from the rear of connector 400. As shown in FIGS. 4A and 4B, each optical waveguide 405 is optionally protected by a boot and/or a strain relief 406 at the rear of the connector housing 401. Each boot and/or strain relief 406 at least partially surrounds the waveguides 405 attached to an optical ferrule 412 and is configured to protect the waveguides 405 from damage and/or to limit bending of a portion of the optical waveguides that extends outside the connector 400.

In some embodiments, the housing 401 can be a unitary molded piece that holds both the electrical contacts 411 and the optical ferrules 412. The housing 401 includes portions 402a configured to hold the electrical contacts 411 and a portion 402b configured to hold the optical ferrules 412. The housing 401 optionally includes an orientation tab 403 configured to orient the connector 400 during mating. The orientation tab 403 engages with a complementary orientation slot (see element 503 or FIGS. 5B and 5C) of a mating connector. The orientation tab 403 and slot 503 (see FIGS. 5B and 5C) limit the possibility of connecting the connector 400 with the mating connector in an incorrect orientation.

Figure 5A:
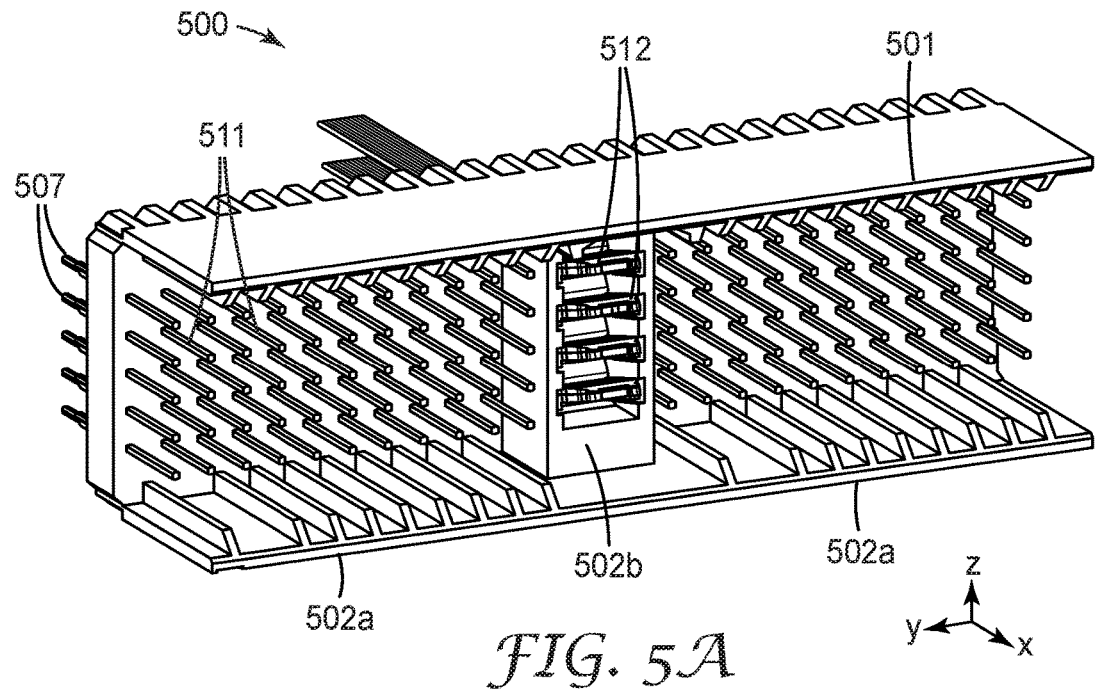
FIGS. 5A through 5D show various views of a hybrid connector configured to mate with the connector shown in FIGS. 4A through 4D.
Figure 5B:
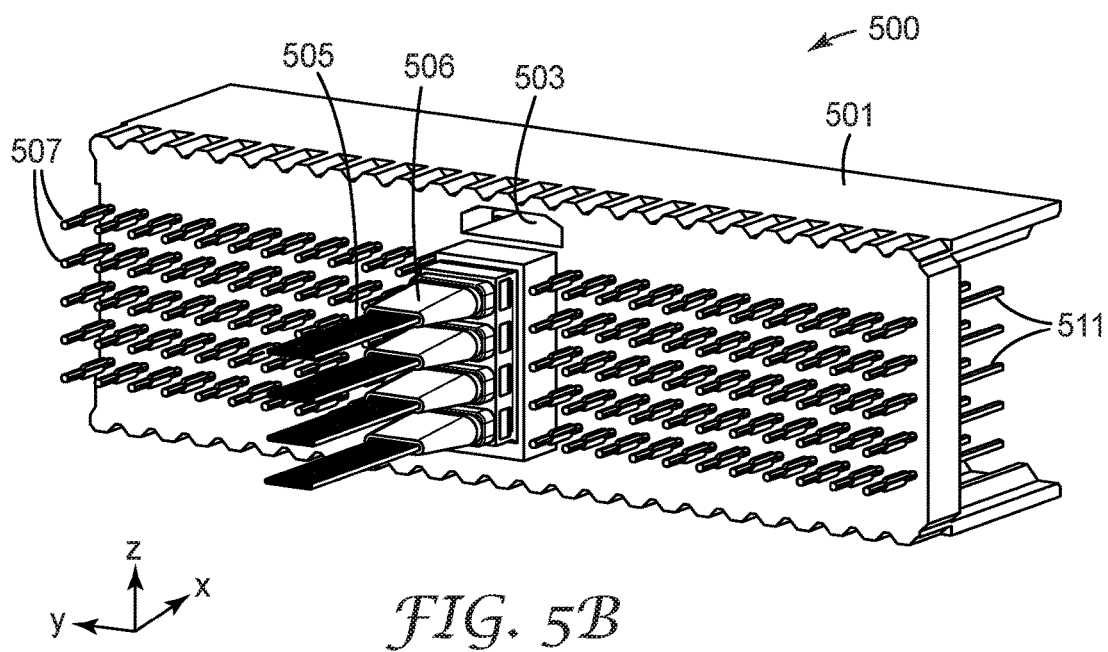
Figure 5C:
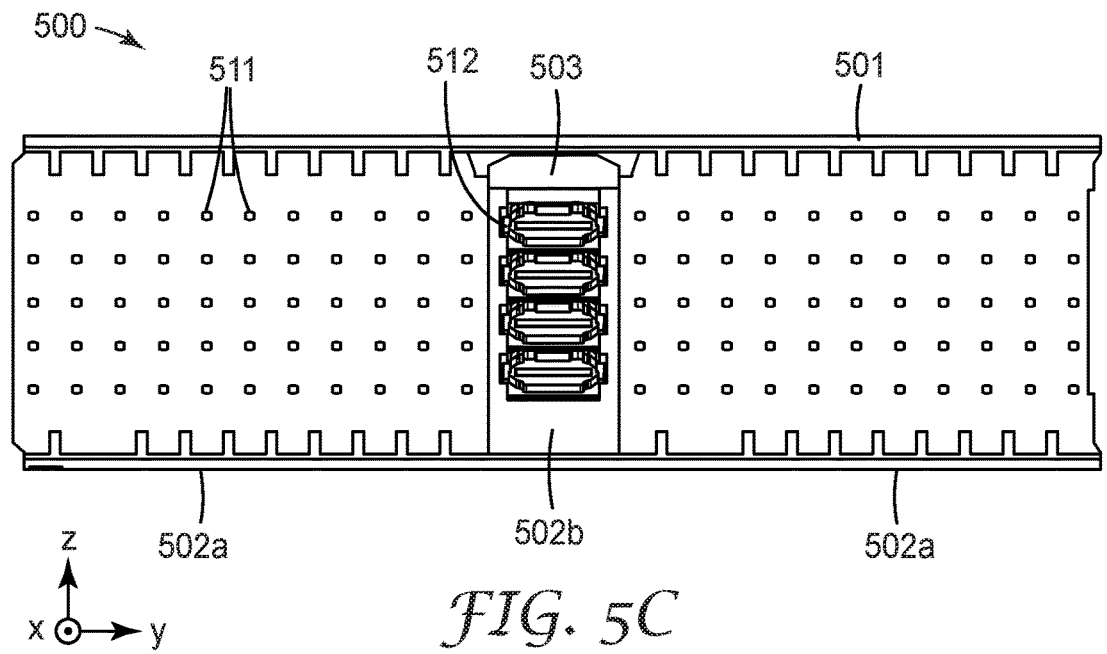
Figure 5D:
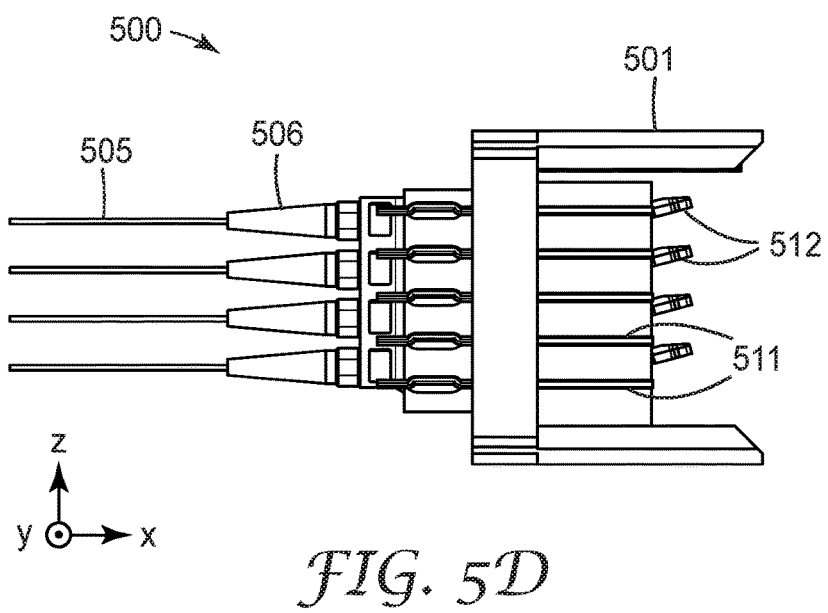

FIGS. 5A through 5D show various views of a hybrid connector 500 configured to mate with connector 400 shown in FIGS. 4A through 4D. FIGS. 5A and 5B show perspective views of the hybrid connector 500. FIG. 5C shows a view looking into connector 500 along the mating axis, x. FIG. 5D shows a side view of the connector 500. Connector 500 includes electrical pin contacts 511 that are configured to mate with the electrical socket contacts 411 of connector 400. The electrical contacts 511 are rotationally fixed within the housing 501 and may also be translationally fixed within the housing 501. The electrical contacts 511 are electrically coupled to solder contacts 507 suitable for soldering to a printed circuit board.

Connector 500 includes optical ferrules 512 that can partially rotate around the y axis, orthogonal to the mating axis, x. The optical ferrules 512 are attached to multiple waveguides 505 that extend from the rear of connector 500. As previously discussed, each optical waveguide 505 may be optionally protected by a boot and/or strain relief 506.

In some embodiments, the housing 501 can be a unitary molded piece that holds both the electrical contacts 511 and the optical ferrules 512. The housing 501 includes portions 502a configured to hold the electrical contacts 511 and a portion 502b configured to hold the optical ferrules 512. The housing 501 optionally includes a locator socket 503 configured to be compatible with the locator tab 403 of connector 400. The locator tab 403 and slot 503 orient the connectors 400, 500 during mating. The orientation tab 403 and slot 503 limit the possibility of mating the connectors 400, 500 in an incorrect orientation.

The second connection elements, e.g., optical ferrules 412, 512 shown in connectors 400, 500, are arranged so that they can rotate with respect to the lateral (y-) axis of the connector, orthogonal to the mating axis, x. The second connection elements 412, 512 may be configured to rotate independently or non-independently as described in more detail below.

Figure 6:
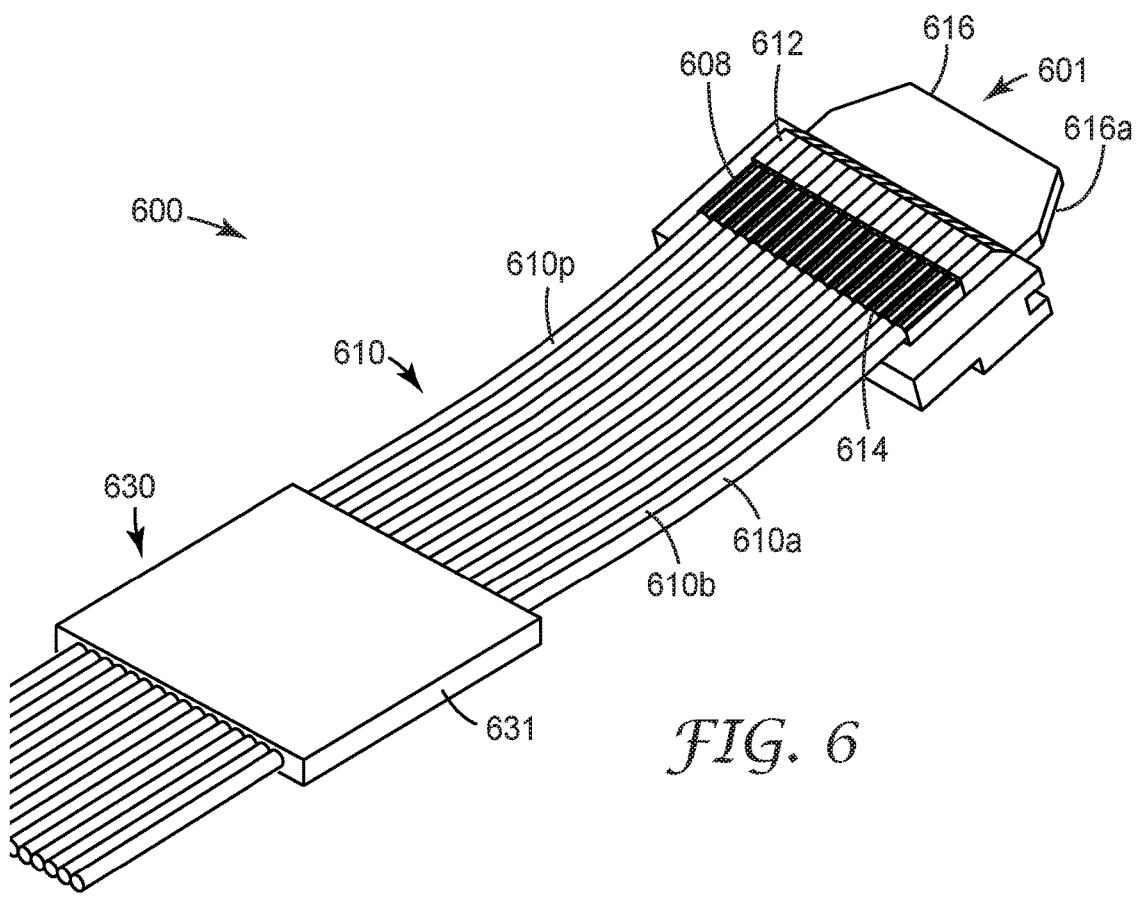
FIG. 6 is an illustration of an optical cable subassembly.

FIG. 6 provides a perspective view of an optical cable subassembly 600 suitable for installation within a connector housing of a hybrid connector as discussed herein. The optical cable subassembly 600 comprises an expanded beam optical ferrule 601 attached to at least one optical waveguide 610. Although FIG. 6 illustrates an optical ferrule 601 attached to an array 610 of individual waveguides 610a-610p, it will be appreciated that in some embodiments, the optical ferrule can be configured to be attached to a single optical waveguide. The term optical waveguide is used herein to refer to an optical element that propagates signal light. An optical waveguide comprises at least one core with a cladding, wherein the core and cladding are configured propagate light within the core, e.g., by total internal reflection. An optical waveguide may be, for example, an optical fiber, a single or multi-mode optical waveguide, a single core waveguide, a multi-core optical waveguide, or a polymeric waveguide. A waveguide may have any suitable cross sectional shape, e.g., circular, square, rectangular etc.

In some embodiments, as discussed in greater detail below, the optical cable subassembly 600 includes a cable retainer 630 that is spaced apart from the optical ferrule 601 and is attached to the optical waveguides 610. The optical waveguides 610 are permanently attached to the optical ferrule 601 at a ferrule attachment area 608. In embodiments that include a cable retainer 630, the optical waveguides 610 are attached to the cable retainer 630 at the retainer attachment area 631.

The optical ferrule 601 is configured to mate, e.g., hermaphroditically, with another optical ferrule (not shown in FIG. 6, but shown in FIGS. 11A through 11D). The optical ferrule 601 illustrated in FIG. 6 includes a mechanical mating tongue or spade 616, light redirecting member 612, and a waveguide attachment area 608. In some embodiments, the mechanical mating tongue 616 can have a tapering width along at least a portion of a length of the tongue portion as shown in the illustrations. In some configurations, the mechanical mating tongue 616 can extend outwardly from the front of the light redirecting member 612. In some embodiments, the bottom surface 616a of the ferrule 600 provides a planar mating surface that facilitates mating of the optical ferrule 600 with a mating optical ferrule.

The ferrule attachment area 608 includes a plurality of grooves 614, each groove being configured to accommodate a different optical waveguide 610a-610p. The grooves 614 are configured to receive an optical waveguide 610a-610p and each optical waveguide 610a-610p is permanently attached to a respective groove 614 at the ferrule attachment area 608, e.g., using an adhesive. The optical waveguides 610 direct light toward the light directing member 612 of the optical ferrule 601.

Figure 7A:
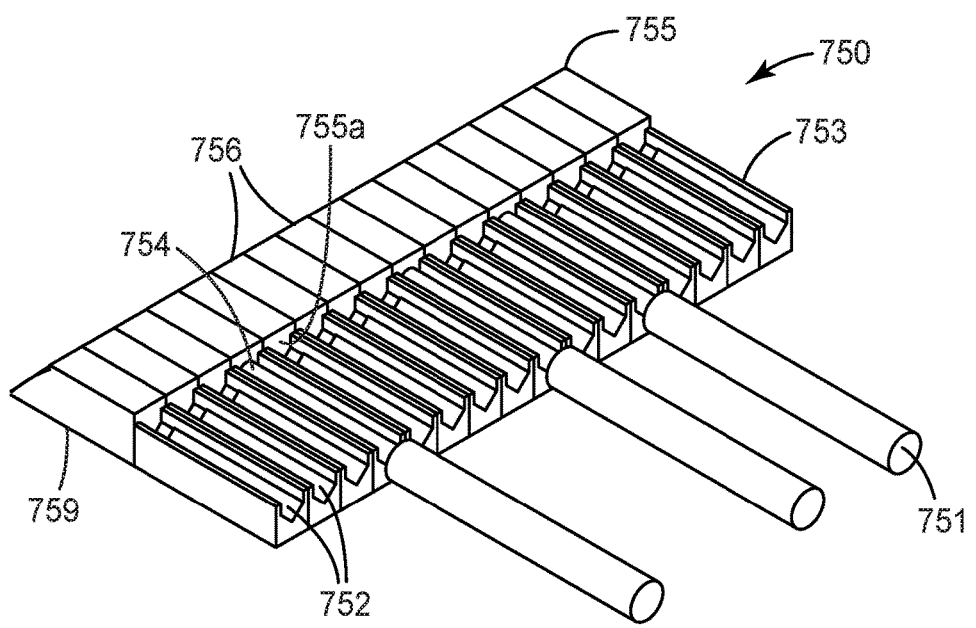
FIGS. 7A and 7B are cutaway views of portions of optical ferrules focusing on the light redirecting portions of the optical ferrules.
Figure 7B:
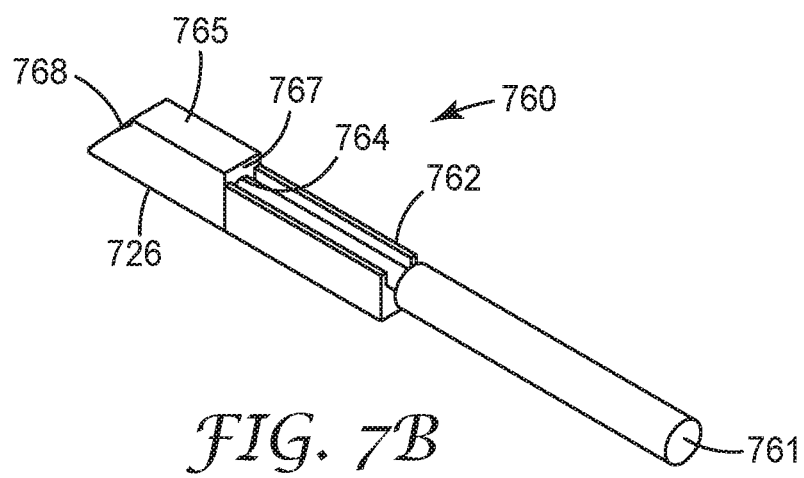

FIGS. 7A and 7B are cutaway views of portions of optical ferrules 750, 760 focusing on the light redirecting portions of the optical ferrules 750, 760. FIG. 7A illustrates the attachment of several optical waveguides 751 to the optical ferrule 750. Optical waveguides 751 are aligned in grooves 752 to which they are permanently attached at the ferrule attachment area 753. At the point of attachment, the fiber buffer coatings and protective jacket (if any) have been stripped away to allow only the bare optical waveguide (core and cladding) to lie aligned and permanently affixed to a groove 752. The terminal ends 754 of optical waveguides 751 are situated so as to be able to direct light emanating from the optical waveguide 751 into the input side 755a of light redirecting member 755. Light redirecting member 755 includes an array of light redirecting elements 756, at least one for each optical waveguide 751 attached to ferrule 750. For example, in various embodiments each light redirecting element 756 comprises one or more of a prism, a lens, and a reflecting surface. The light redirecting member 755 also includes output surface or window 759 that receives light from light redirecting elements 756 and transmits the received light as output light along an output direction toward a light redirecting member of a mating light coupling unit.

FIG. 7B is a cutaway view of a portion of an optical ferrule 760 that includes a single light redirecting member 765, one waveguide alignment member, e.g., groove 762, and one optical waveguide 761. In this illustration, optical waveguide 761 is aligned in groove 762 and may be permanently attached to it. At the point of attachment, the fiber buffer coating and protective jacket (if any) have been stripped away to allow only the bare optical waveguide (core and cladding) to lie aligned and permanently affixed to groove 762. Light redirecting member 765 includes light input side 767 for receiving input light from the terminal end 764 the optical waveguide (e.g., optical fiber) 761 disposed and aligned at the waveguide alignment member 762. Light redirecting member 765 also includes light redirecting element 768 that may include a curved surface for receiving light from the input side 767 along an input direction and redirecting the received light along a different redirected direction. The light redirecting member 765 also includes output surface or window 726 that receives light from light redirecting element 768 of light redirecting member 765 and transmits the received light as output light along an output direction toward a light redirecting member of a mating light coupling unit.

Figure 8A:
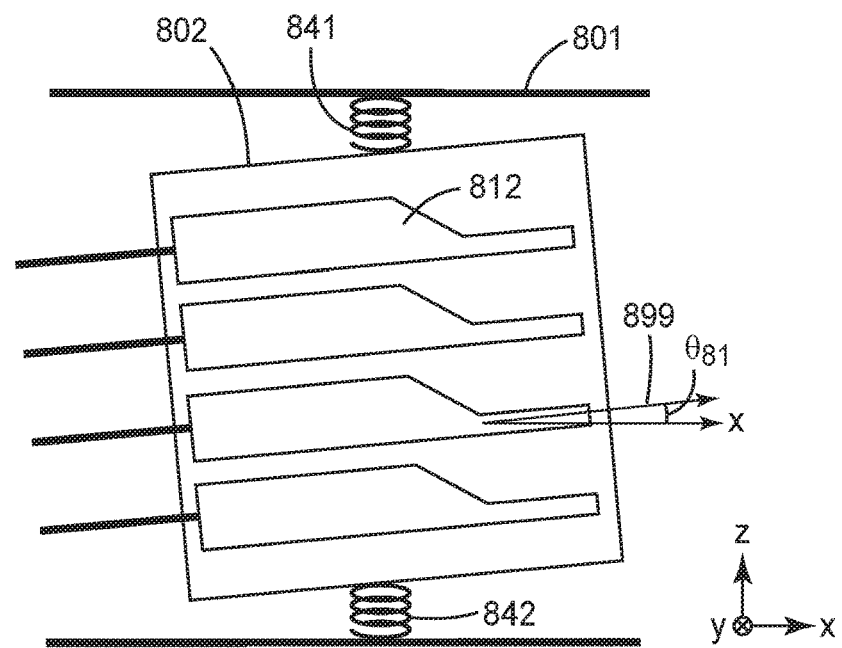
FIGS. 8A and 8B show optical ferrules held by an inner housing and configured to rotate non-independently in accordance with some embodiments.
Figure 8B:
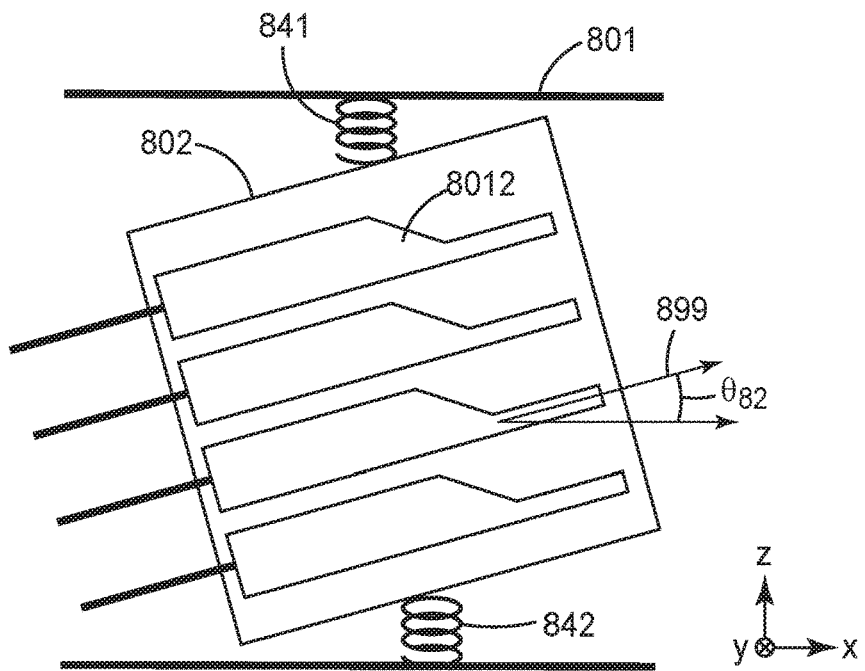

FIGS. 8A and 8B show optical ferrules 812 within a connector housing 801. Each of the optical ferrules 812 is held by an inner housing 802 and is rotationally fixed with respect to the inner housing 802. The inner housing 802 may be coupled to the connector housing 801 by compliant features 841, 842 that allow for rotational and/or translational movement of the inner housing 802. The inner housing 802 can rotate at least partially around the y-axis within the connector housing 801. Rotation of the inner housing 802 causes the optical ferrules 812 in the inner housing 802 to rotate collectively and non-independently around the y-axis. FIGS. 8A and 8B respectively show the inner housing 802 and the optical ferrules 812 rotated around the y axis so that the longitudinal axis 899 of the optical ferrules 812 makes an angle $\theta_{81}$ (FIG. 8A) and an angle $\theta_{82}$ (FIG. 8B) with respect to the mating axis, x, of the connector housing 801.

Figure 9A:
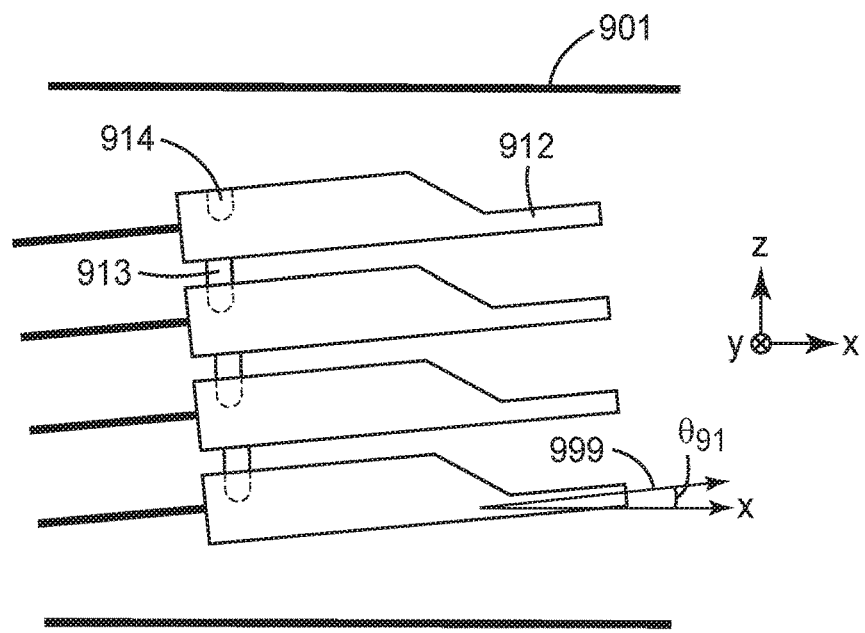
FIGS. 9A and 9B provide another example of non-independent rotation of the optical ferrules according to some embodiments.
Figure 9B:
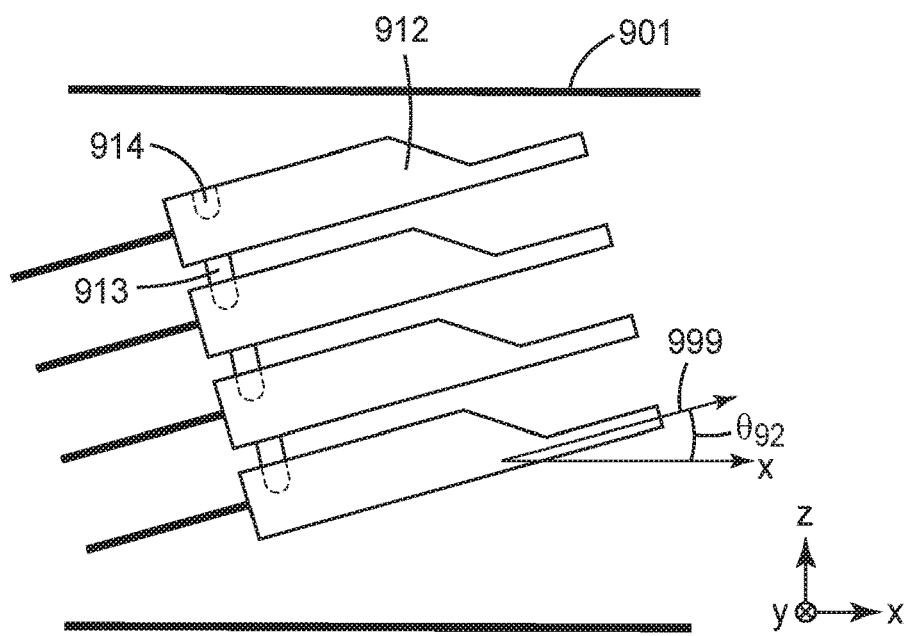

FIGS. 9A and 9B provide another example of non-independent rotation of the optical ferrules 912 around the y axis within the connector housing 901. In this example, the optical ferrules 912 are coupled by ferrule coupling features exemplified by a tab 913 that can be inserted into a slot 914 of an adjacent ferrule 912. The ferrule coupling features ensure that the ferrules 912 rotate collectively and non-independently around the y axis. FIGS. 9A and 9B, respectively, show the optical ferrules 912 rotated around the y axis so that the longitudinal axis 999 of the optical ferrules 912 makes an angle $\theta_{91}$ (FIG. 9A) and an angle $\theta_{92}$ (FIG. 9B) with respect to the mating axis, x, of the connector housing 901.

Figure 10:
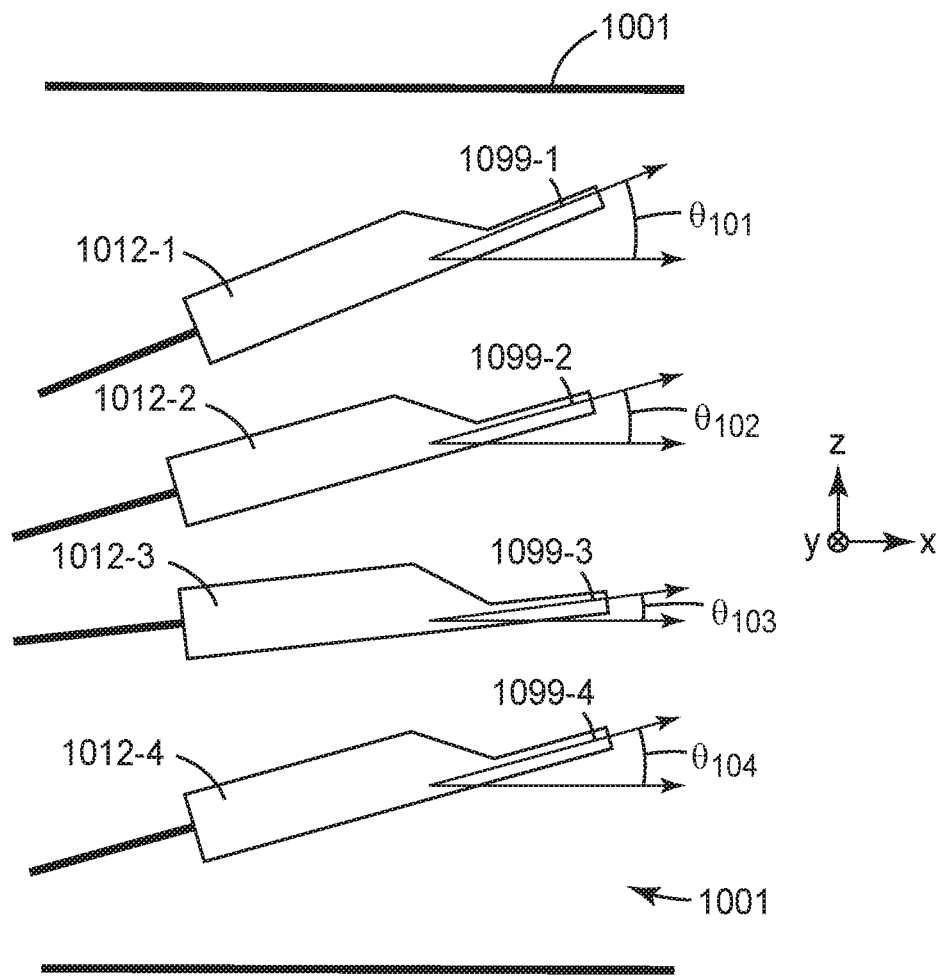
FIG. 10 illustrates independent rotation of optical ferrules according to some embodiments.

FIG. 10 illustrates a portion of a hybrid connector that includes independent rotation of the optical ferrules 1012-1, 1012-2, 1012-3, 1012-4 within the connector housing 1001. Each optical ferrule 1012-1, 1012-2, 1012-3, 1012-4 is configured to rotate around the y axis independently from the rotation of any other ferrules 1012-1, 1012-2, 1012-3, 1012-4. In FIG. 10, optical ferrule 1012-1 is shown rotated around the y axis such that the longitudinal axis 1099-1 of optical ferrule 1012-1 makes an angle $\theta_{101}$ with respect to the mating axis, x, of the connector housing 1001; optical ferrule 1012-2 is shown rotated around the y axis such that the longitudinal axis 1099-2 of optical ferrule 1012-2 makes an angle $\theta_{102}$ with respect to the mating axis, x, of the connector housing 1001; optical ferrule 1012-3 is shown rotated around the y axis such that the longitudinal axis 1099-3 of optical ferrule 1012-3 makes an angle $\theta_{103}$ with respect to the mating axis, x, of the connector housing 1001; and optical ferrule 1012-4 is shown rotated around the y axis such that the longitudinal axis 1099-4 of optical ferrule 1012-4 makes an angle $\theta_{104}$ with respect to the mating axis, x, of the connector housing 1001, where in this example $\theta_{101} \neq \theta_{102} \neq \theta_{103} \neq \theta_{104}$.

In some embodiments, during mating, the first, non-rotatable connection elements are engaged prior to engagement of the second, rotatable connection elements. Engagement of the first connection elements provides lateral (y axis) and/or vertical (z axis) alignment of the hybrid connector and the mating connector which also facilitates lateral and/or vertical alignment of the second connection elements. After both the non-rotatable and rotatable connection elements are fully mated, a stop feature of the hybrid connector prevents further translational movement of the first connection elements along the mating axis of the connector and further translational and rotational movement of the second connection elements.

Figure 11A:
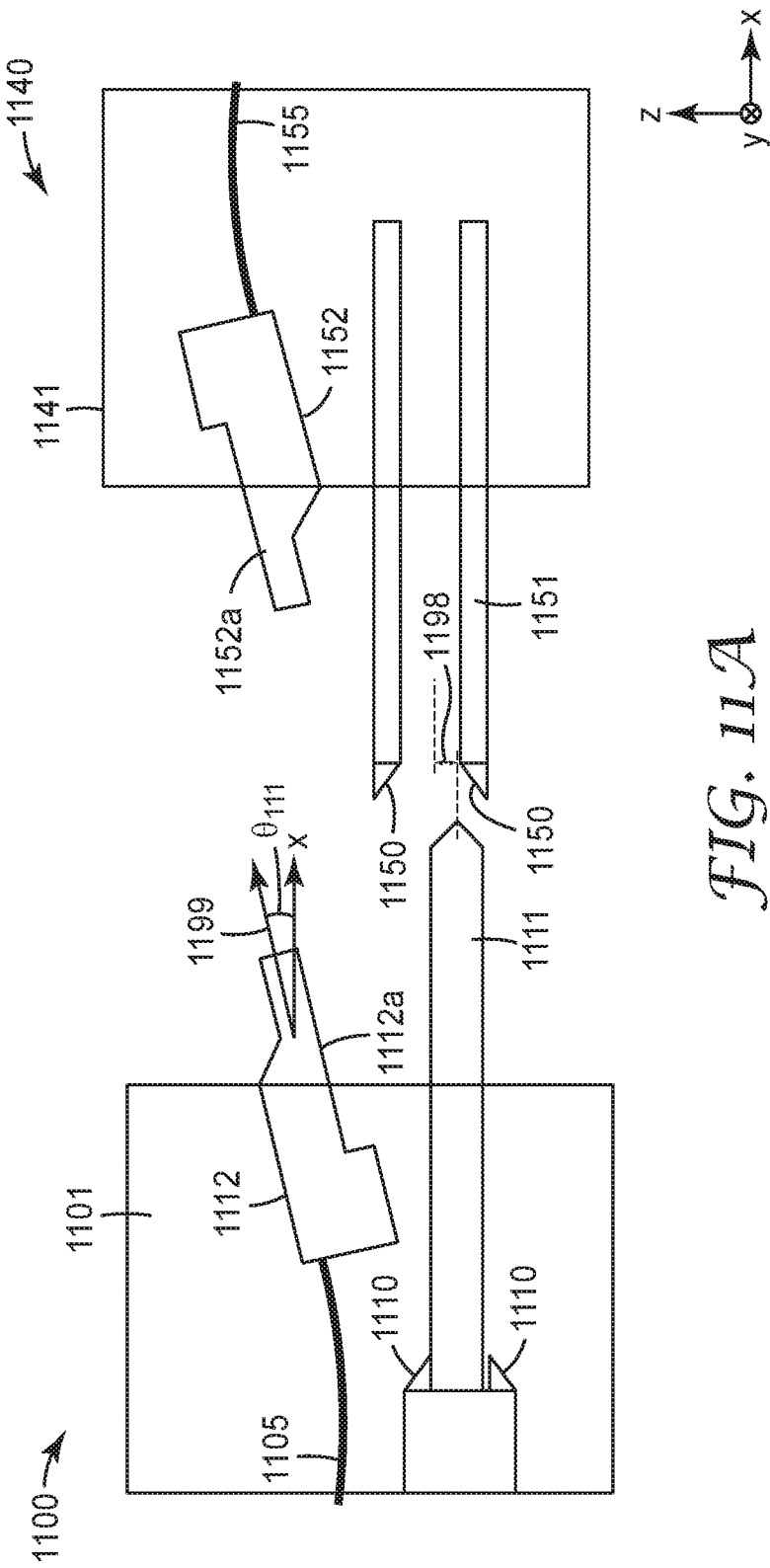
FIGS. 11A through 11D depict the process by which a hybrid connector having first and second connection elements mates with a mating connector.

FIGS. 11A through 11D illustrate first 1111, 1151 and second 1112, 1152 connection elements of a hybrid connector 1100 and a mating hybrid connector 1140 during mating. In this discussion, the mating first connection elements 1151 and the mating second connection elements 1152 are disposed within a housing 1141 which is translationally fixed at a position along the mating axis (x axis). FIG. 11A schematically illustrates a cross sectional view of a first connection element, exemplified as an electrical pin 1111, and a second connection element, exemplified as an optical ferrule 1112 disposed in housing 1101 prior to mating with an electrical socket 1151 and an optical ferrule 1152 of the mating hybrid connector 1140. In this example the hybrid connector 1100 and the mating hybrid connector 1140 are initially vertically misaligned as indicated by arrow 1198.

Figure 11B:
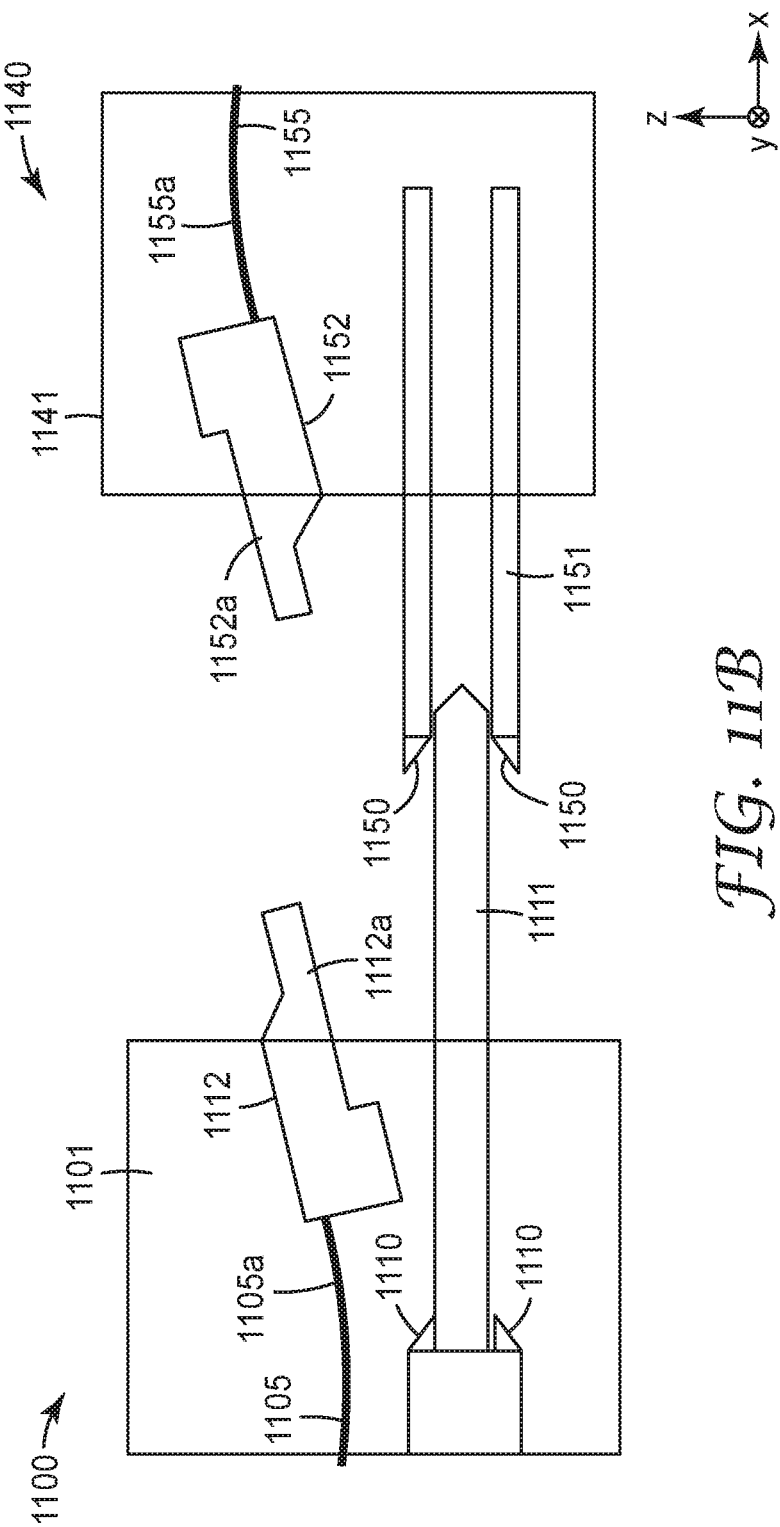
Figure 11C:
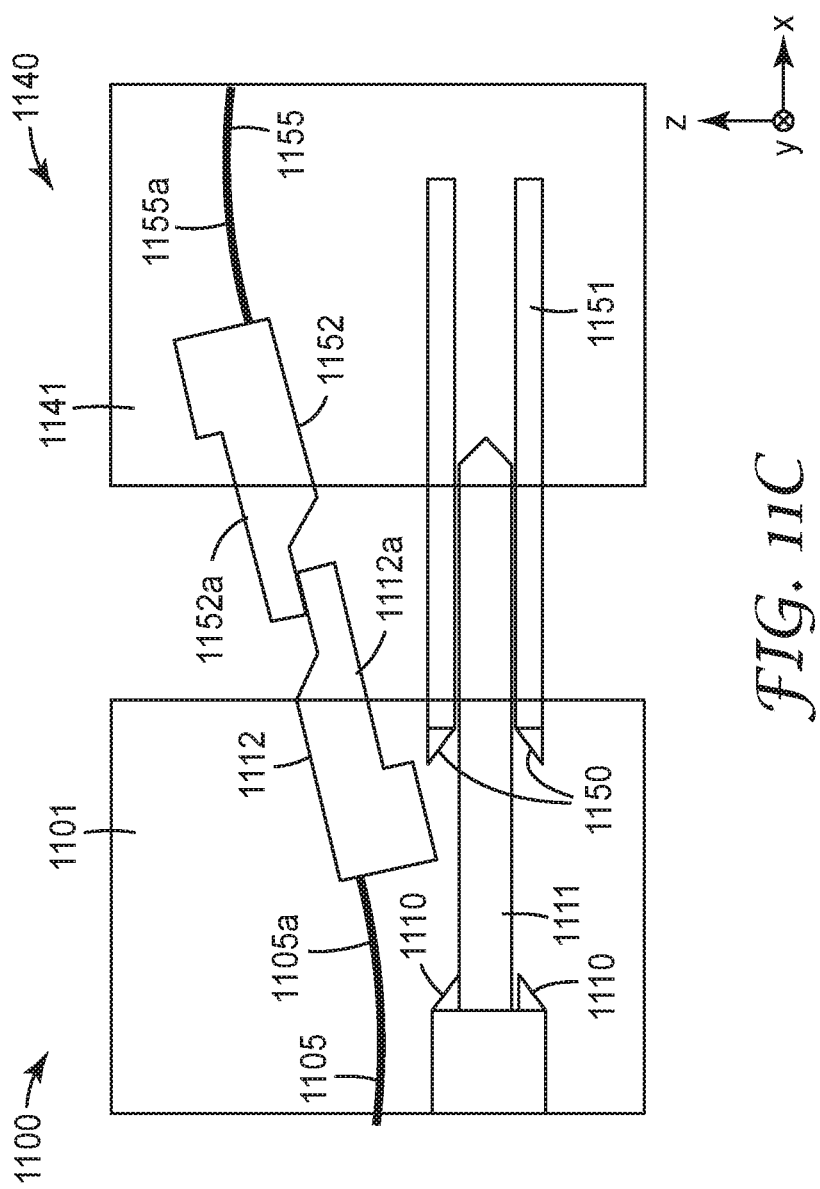
Figure 11D:
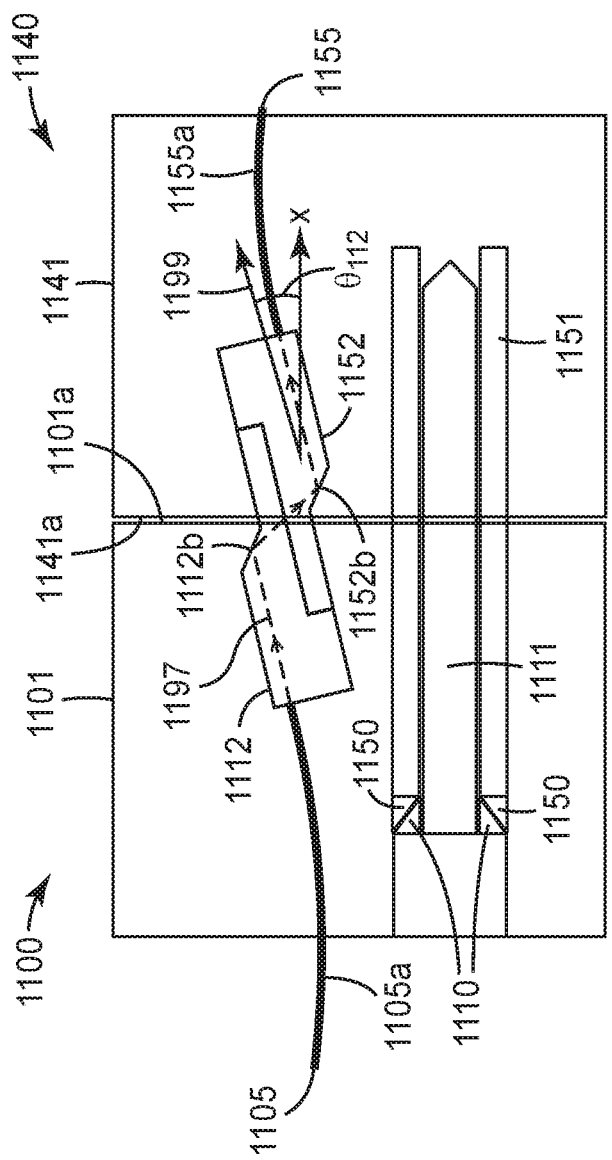

In FIG. 11B, the electrical pin 1111 is engaged with the socket 1151 but the optical ferrules 1112, 1152 are not yet engaged. The engagement of the electrical pin 1111 with the socket 1151 has reduced the vertical misalignment of the hybrid connector 1100 with the mating hybrid connector 1140. In FIG. 11C, the electrical pin 1111 is partially engaged with the mating socket 1151 and the optical ferrule 1112 is partially engaged with the mating optical ferrule 1152. The optical ferrules 1112, 1152 engage as the planar surfaces 1112a, 1152a begin to slide against each other. As the connector 1100 including pin 1111 and ferrule 1112 moves further along the mating axis, in some embodiments, pin and socket stop features 1110, 1150 engage and restrict further translational movement of the connector 1100 including the electrical pin 1111 and ferrule 1112. In some embodiments, the stop features comprise faces 1101a, 1141a of the housings 1101, 1141 as indicated in FIG. 11D. As the optical ferrules 1112, 1152 further engage between the position shown in FIG. 11C and the position shown in FIG. 11D, the optical ferrules 1112, 1152 rotate around they axis and a bend 1105a, 1155a in the optical waveguides 1105, 1155 develops and/or further develops. The bend provides a spring force that holds the optical ferrules 1112, 1152 in a mated position (shown in FIG. 11D). Engagement of the stop features occurs before the bend 1105a, 1155a in the optical waveguides 1105, 1155 reaches a predetermined bend radius, preventing excessive bending of the optical waveguides 1105, 1155. Dashed line 1197 shows the path of light carried by optical waveguide 1105, to light redirecting element 1112b of optical ferrule 1112, through the output window of optical ferrule 1112 to light redirecting element 1152b of optical ferrule 1152, and to optical waveguide 1155.

Figure 12A:
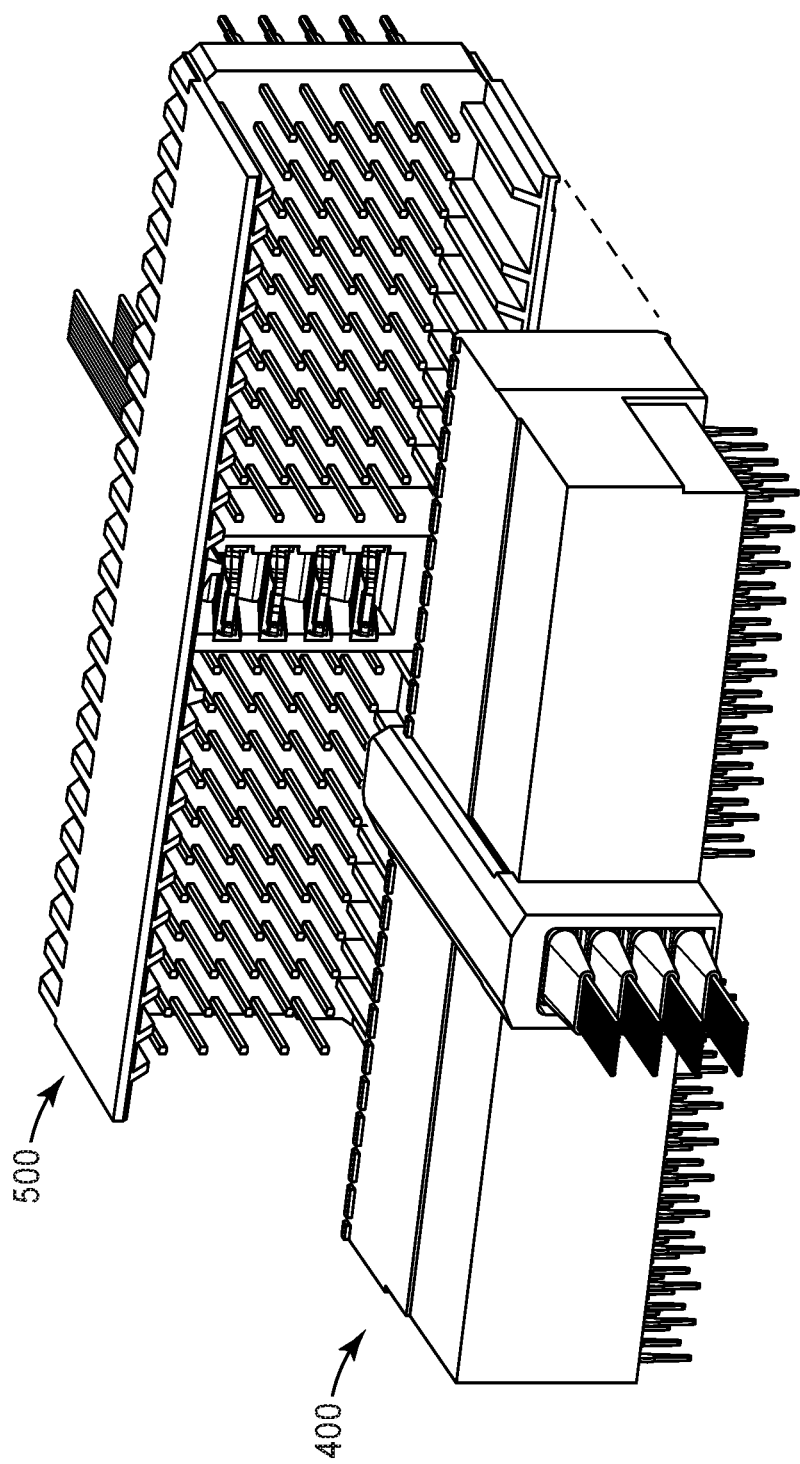
Figure 12D:
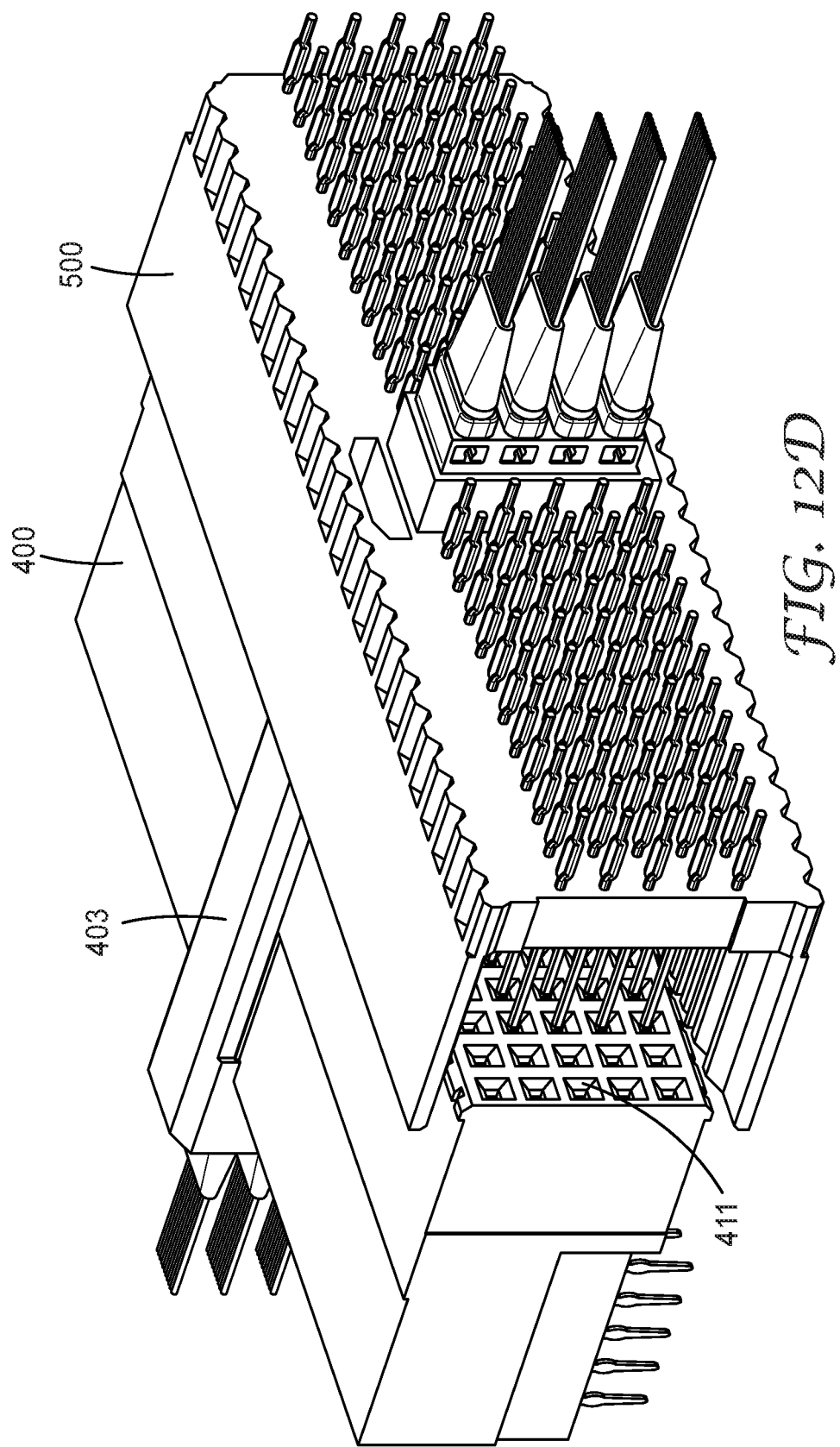
Figure 12E:
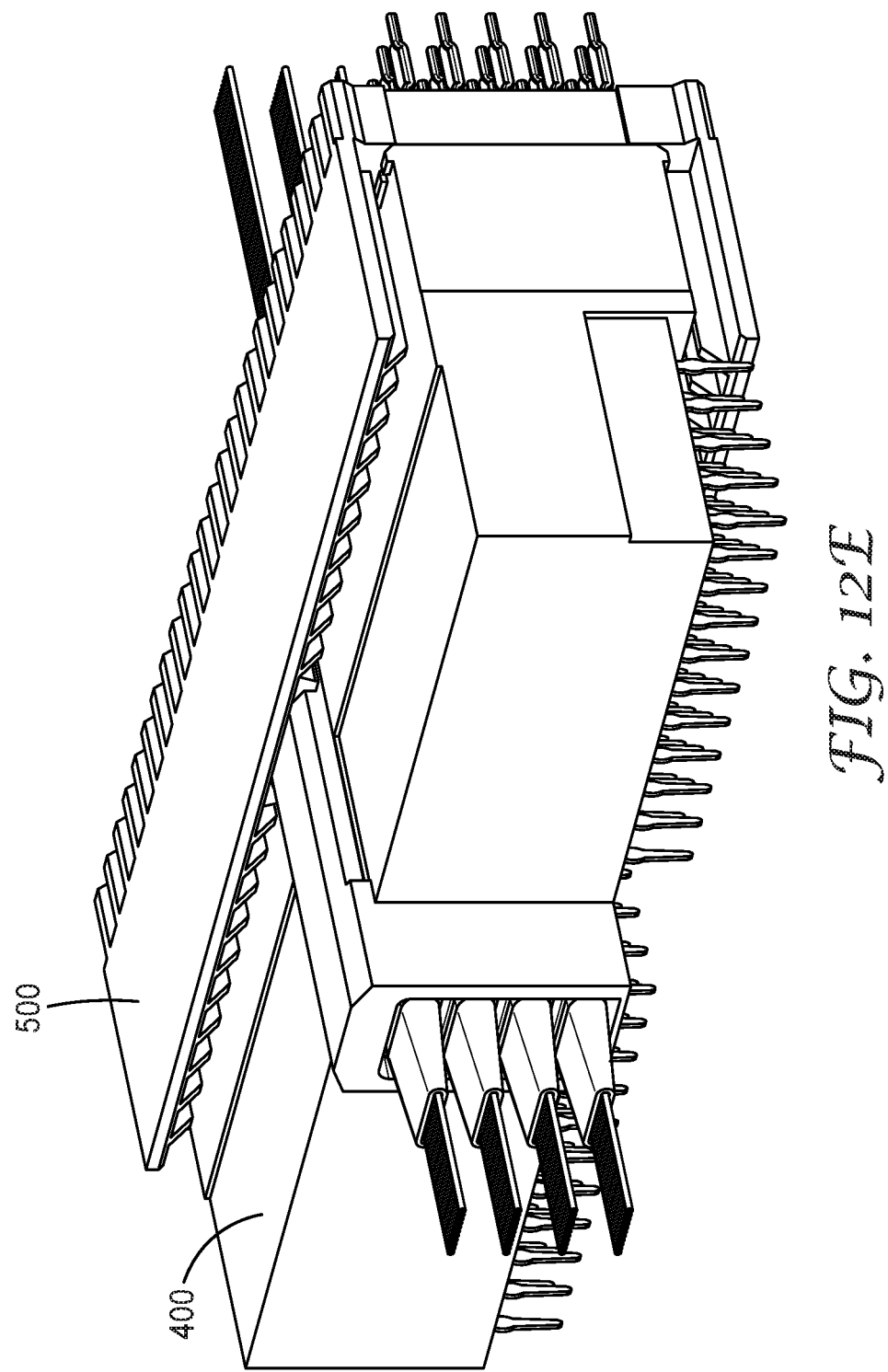

FIGS. 12A through 12F illustrate connector 400 of FIGS. 4A through 4D and connector 500 of FIGS. 5A through 5D before, during, and after (FIGS. 12E and 12F) mating. FIGS. 12A and 12B are top (FIG. 12A) and bottom (FIG. 12B) perspective views of connectors 400 and 500 prior to mating. FIGS. 12C and 12D are top perspective views of connectors 400, 500 during mating. In FIGS. 12C and 12D, the orientation tab 403 of connector 400 has engaged with orientation slot 503 of connector 500 and engagement of the electrical contacts 411, 511 and optical ferrules 412, 512 has not yet occurred. FIGS. 12E and 12F are perspective views showing the connectors 400, 500 after mating.

Figure 13A:
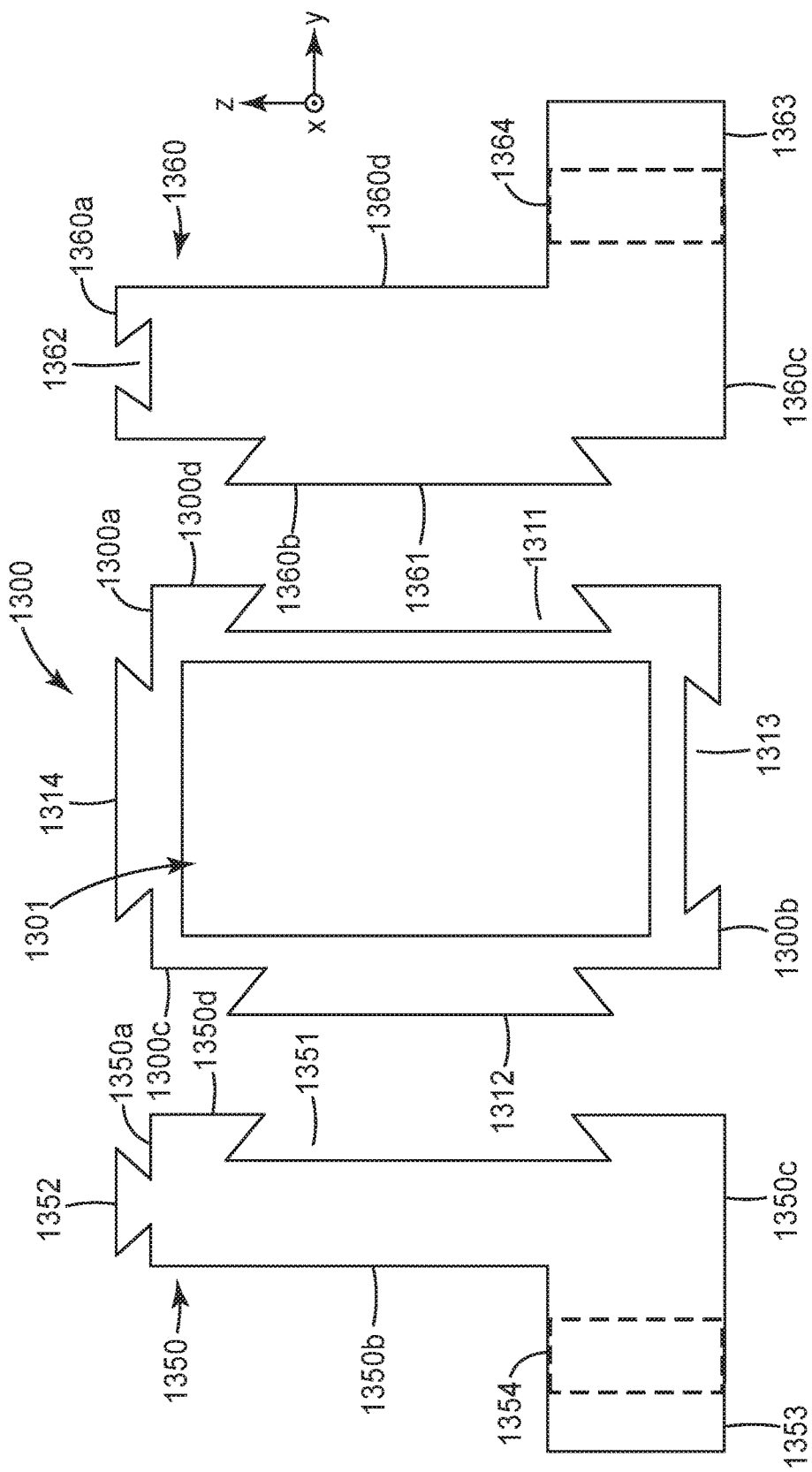
FIGS. 13A and 13B illustrate a connector module for a modular hybrid connector in accordance with some embodiments.
Figure 13B:
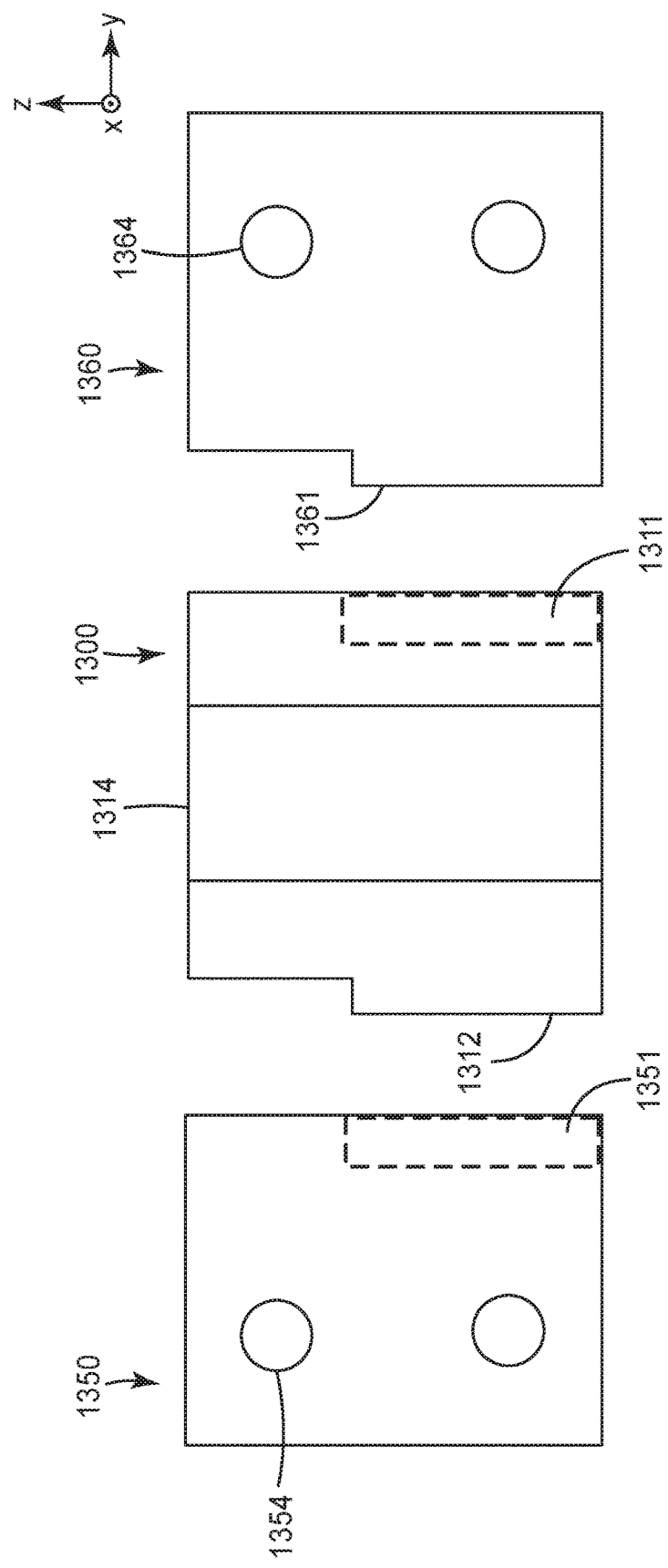

In some embodiments, the connectors comprising non-rotatable connection elements and rotatable connection elements can be modular and configurable. FIGS. 13A and 13B illustrate a connector module 1300 for a modular hybrid connector in accordance with some embodiments. The connector module may comprise either rotatable or non-rotatable connection elements, for example. The module 1300 can be coupled or interlocked with other modules to form a modular hybrid connector. FIG. 13A is an exploded view of the module 100 and module mounts 1350, 1360 from the perspective of looking at the module along the mating (x-) axis. FIG. 13B is an exploded bottom view showing the module 1300 and module mounts 1350, 1360.

The module 1300 can include rotatable or non-rotatable connection elements. For example, the module 1300 may contain one or more optical cable subassemblies (not shown in FIGS. 13A and 13B), each optical subassembly comprising a rotatable optical ferrule attached to an optical waveguide at a ferrule attachment area. In some embodiments, the module 1300 includes one or more passageways, e.g., curved passageways, and/or features that contain and/or support the optical cable subassemblies.

As shown in FIGS. 13A and 13B, the module 1300 includes module connecting features 1311, 1312, 1313, 1314 configured to engage with compatible module connecting features of a neighboring module (not shown in FIGS. 13A and 13B) or with compatible module connecting features 1351, 1361 of connector mounts 1350, 1360. The module connecting features 1311, 1312, 1313, 1314 may optionally be disposed at the exterior of one, two, or more of the right 1300d, left 1300c, bottom 1300b, and top 1300a sidewalls of the module 1300. For example, the module connecting features may be disposed on the exterior of two parallel sidewalls, e.g., left and right sidewalls or top and bottom sidewalls. In some embodiments, the module connecting features may be disposed on at least two adjacent sides and/or or at least two non-parallel sides.

As shown, the module connecting features 1311, 1312, 1313, 1314 are interlocking dovetail features, although it will be appreciated that many other types of mechanical features, e.g., pins and sockets, grooves, etc. could be used to interconnect the modules. Additionally, or alternatively, features other than mechanical interlocking features, e.g., adhesive features, magnetic features, etc., could be used to connect the modules 1300 together and/or to connect the modules 1300 to the connector mounts 1350, 1360. FIG. 13A illustrates the module connecting features comprising interlocking dovetail features including top projection 1314 at the top side 1300a of the module 1300, a bottom recess 1313 at the bottom side 1300b of the module 1300, a left side projection 1312 at the left side 1300c of the module 1300, and a right side recess 1311 at the right side 1300d of the module 1300.

In some implementations, it is useful to mount the modular optical connector to a substrate such as a printed circuit board and/or backplane. In these applications, modules 1300 may be disposed between connector mounts 1350, 1360 that include flanges 1353, 1363 with holes 1354, 1364 for insertion of screws, rivets, or other fasteners to attach the connector mounts 1350, 1360 to the substrate (not shown).

Figure 14:
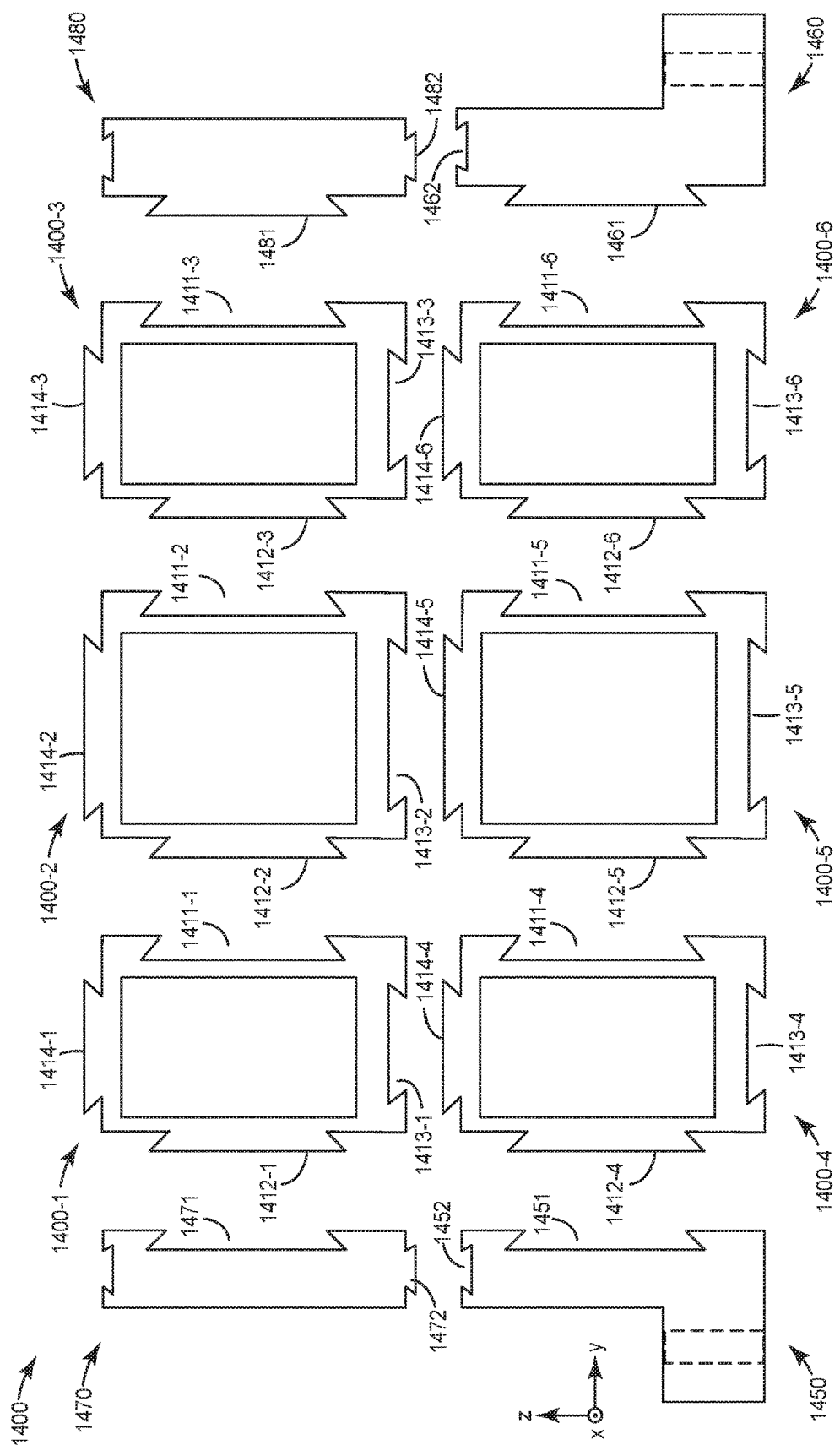
FIG. 14 is an exploded view of a modular optical connector that includes multiple modules.

As illustrated in the exploded view of FIG. 14, an assembled modular optical connector 1400 may include multiple modules 1400-1-1400-6 that are stacked along two perpendicular axes, e.g., vertically along the z axis and/or horizontally along the y axis as shown in FIG. 1400. Some of the modules, e.g., 1400-1, 1400-3, 1400-4, 1400-6 include non-rotatable connection elements, such as electrical contacts, and some of the modules, e.g., 1400-2, 1400-5 include rotatable connection elements, such as optical ferrules or fluid couplings. Each module 1400-1, 1400-2, 1400-3, 1400-4, 1400-5, 1400-6 is mechanically coupled by module connecting features 1411-1414 to at least one neighboring module 1400-1, 1400-2, 1400-3, 1400-4, 1400-5, 1400-6. For example, in the illustrated embodiment, module 1400-1 is mechanically coupled to horizontal neighbor 1400-2 and vertical neighbor 1400-4; module 1400-2 is mechanically coupled to horizontal neighbors 1400-1 and 1400-3 and to vertical neighbor 1400-5, etc. The top 1414 and bottom 1413 module connecting features facilitate stacking the optical modules 1400-1-1400-6 vertically along the z-axis as shown in FIG. 14. Right side 1411 and left side 1412 module connecting features facilitate stacking the optical modules 1400-1-1400-6 horizontally along the y-axis.

The assembled modular connector 1400 includes connector mounts 1450, 1460 that include module connecting features 1451, 1452, 1461, 1462. Connector mount 1450 is mechanically coupled to module 1400-4 by module connecting features 1412-4 and 1451; connector mount 1460 is mechanically coupled to module 1400-6 by module connecting features 1411-6 and 1461. The assembled modular connector 1400 may optionally include connector mounts 1470, 1480 without flanges. Non-flanged connector mount 1470 includes module connecting feature 1471 and mount connecting feature 1472. Non-flanged connector mount 1480 includes module connecting feature 1481 and mount connecting feature 1482. Engagement of feature 1412-1 of module 1400-1 and feature 1471 mechanically couples the non-flanged connector mount 1470 to ferrule support module 1400-1. Engagement of feature 1452 and feature 1472 mechanically couple non-flanged connector mount 1470 to flanged connector mount 1450. Features 1411-3 and 1481 mechanically couple the connector mount 1480 to ferrule support module 1400-3. Features 1462 and 1482 mechanically couple non-flanged connector mount 1480 to flanged connector mount 1460. The assembled modular connector 1400 may optionally include a top piece (not shown) that extends between connector mount 1470 and connector mount 1480.

Figure 15A:
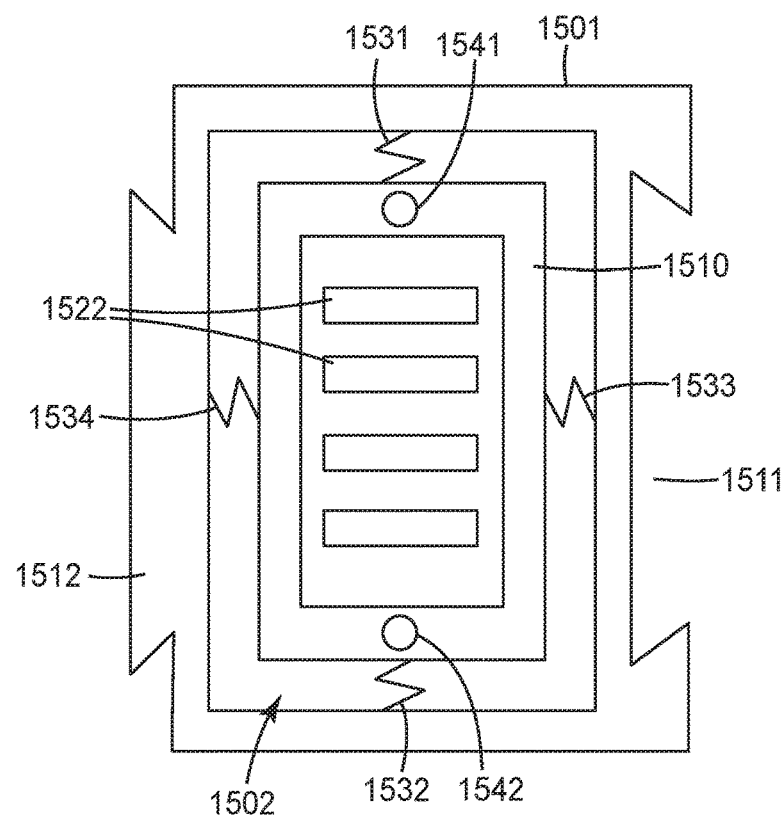
FIGS. 15A and 15B show a module for a configurable modular hybrid connector that comprises an inner floating support structure with rotatable connection elements in accordance with some embodiments.
Figure 15B:
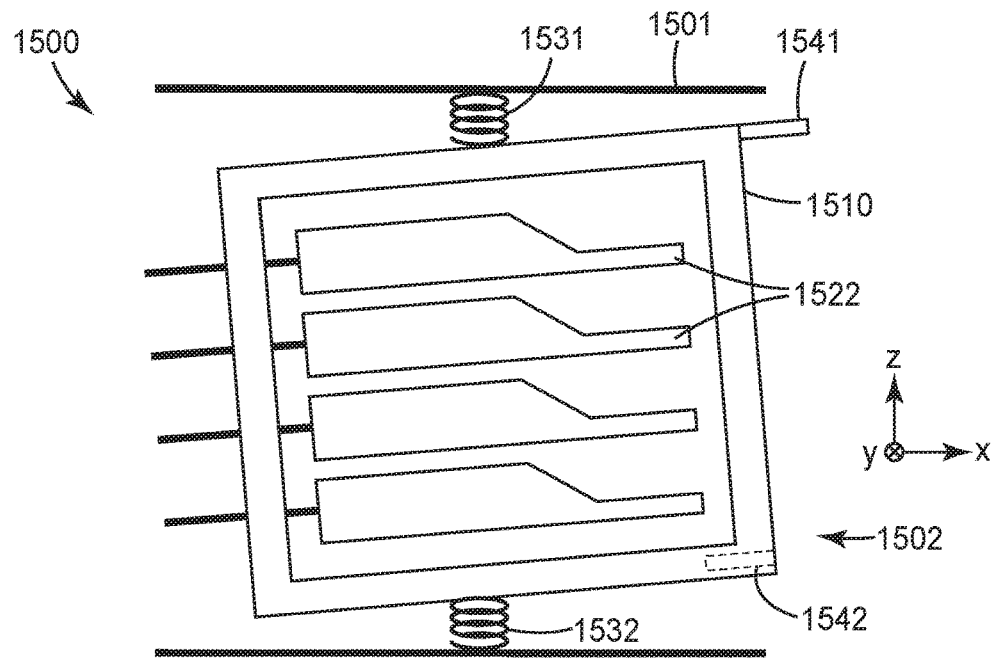

FIGS. 15A and 15B shows a module 1501 for a hybrid connector that comprises an inner floating support structure 1510 with rotatable connection elements, e.g., optical ferrules 1522, positioned within the inner floating support structure 1510. The inner floating support structure 1510 may be held within the interior 1502 of the module 1501 by one or more features 1531-1534 that allow the inner support module to rotate around the x, y, and/or z axes. For example, in some embodiments, the features 1531-1534 may comprise springs, compliant features, and/or other features that allow rotation. In some embodiments, the features 1531, 1534 may additionally allow some amount of translation along x, y, and/or z axes. The inner support structure 1510 can be coupled to an interior of the sidewalls of the module by compliant features 1531-1534. FIG. 15A shows a view looking into the interior 1502 of the module 1501 and inner floating support 1510. FIG. 15B is a cutaway side view of the module 1501.

In this example, the inner floating support 1510 "floats" due to the compliant features 1531, 1532, 1533, 1534 which allow some rotation of the inner floating support around the x, y, and z axes and optionally some translation along the x, y, and z axes. In some embodiments, the inner floating support 1510 includes ferrule support features that support and hold the optical ferrules 1522 so that the rotation and/or translation of the floating support 1510 causes the ferrules 1522 to move together, e.g., non-independently around the y axis. In some embodiments, the support features of the inner floating support 1510 could alternatively be configured to allow for independent rotation and/or translation of the ferrules or other rotatable connection elements.

During mating, the modular hybrid connector may be aligned along the lateral (y-) and vertical (z-) axes with a mating hybrid connector by the non-rotatable connection elements. In addition to alignment by the non-rotatable connection elements, the inner floating support 1510 optionally includes alignment features, such as a pin 1541 and a socket 1542 configured to align the inner floating support 1510 with a compatible socket and pin of a mating inner floating support of a mating module. Alternatively or additionally, the alignment features may comprise side arms, e.g., flexible side arms, as described in connection with FIG. 17.

The module 1501 includes module connecting features 1511, 1512, configured to engage with compatible module connecting features of a neighboring module (not shown in FIGS. 15A and 15B) or with compatible module connecting features of one or more connector mounts 1350, 1360 shown in FIGS. 13A and 13B. Module connecting features 1511 and 1512 are shown at the left and right sides of the module 1501 in FIG. 15A. Additionally, or alternatively, module connecting features may optionally be disposed at top and bottom sides of the modules 1501 to allow for two dimensional stacking of modules 1501.

Figure 15C:
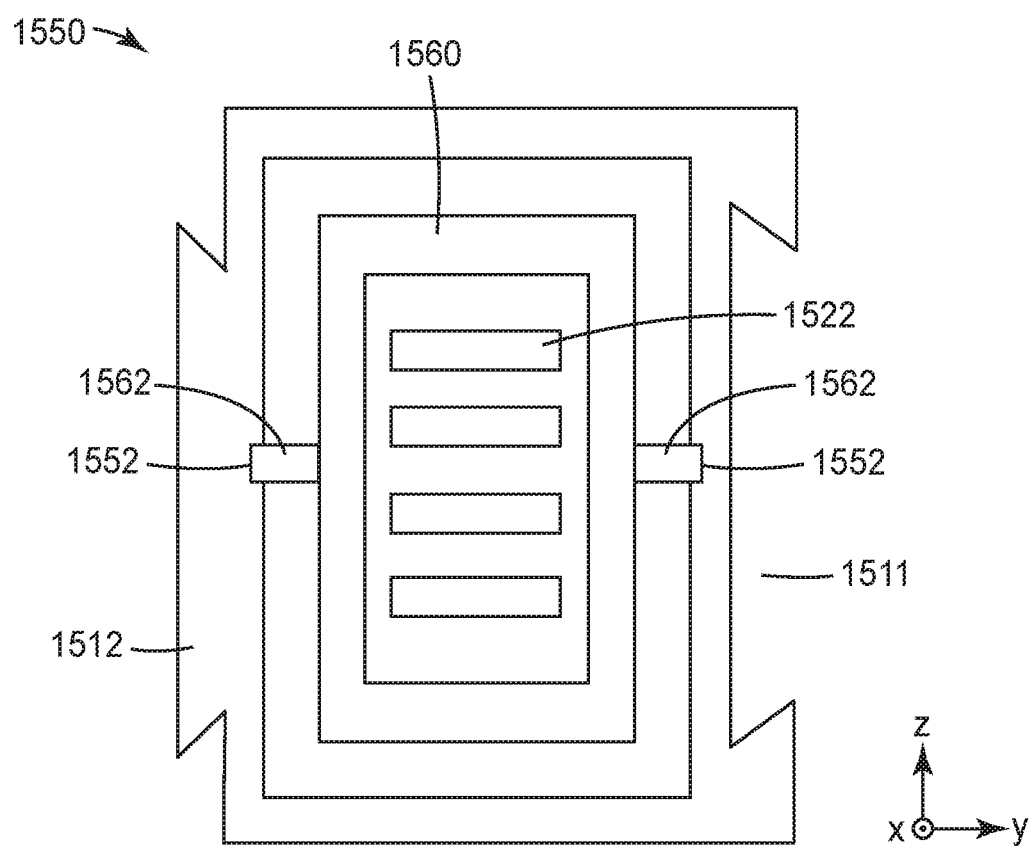
FIG. 15C shows a module for a configurable modular hybrid connector that includes an inner semi-floating inner support structure in accordance with some embodiments.

FIG. 15C shows a configurable hybrid connector module 1550 that includes an inner support structure 1560 (referred to as a "semi-floating" support structure) having limited movement when compared to the movement of the floating support structure described above. The inner support 1560 includes pins 1562 inserted into holes 1552 in the inner walls of the module 1550. In some configurations, the semi-floating inner support 1560 is capable of rotating around the y axis, but rotation around the x and z axes and translation along the x, y, and z axes may be restricted. Alternatively, the inner walls of the module 1550 may have slots instead of holes, wherein the slots are configured to allow for some translation of the inner support 1560 along the x, y and/or z axes.

Figure 16:
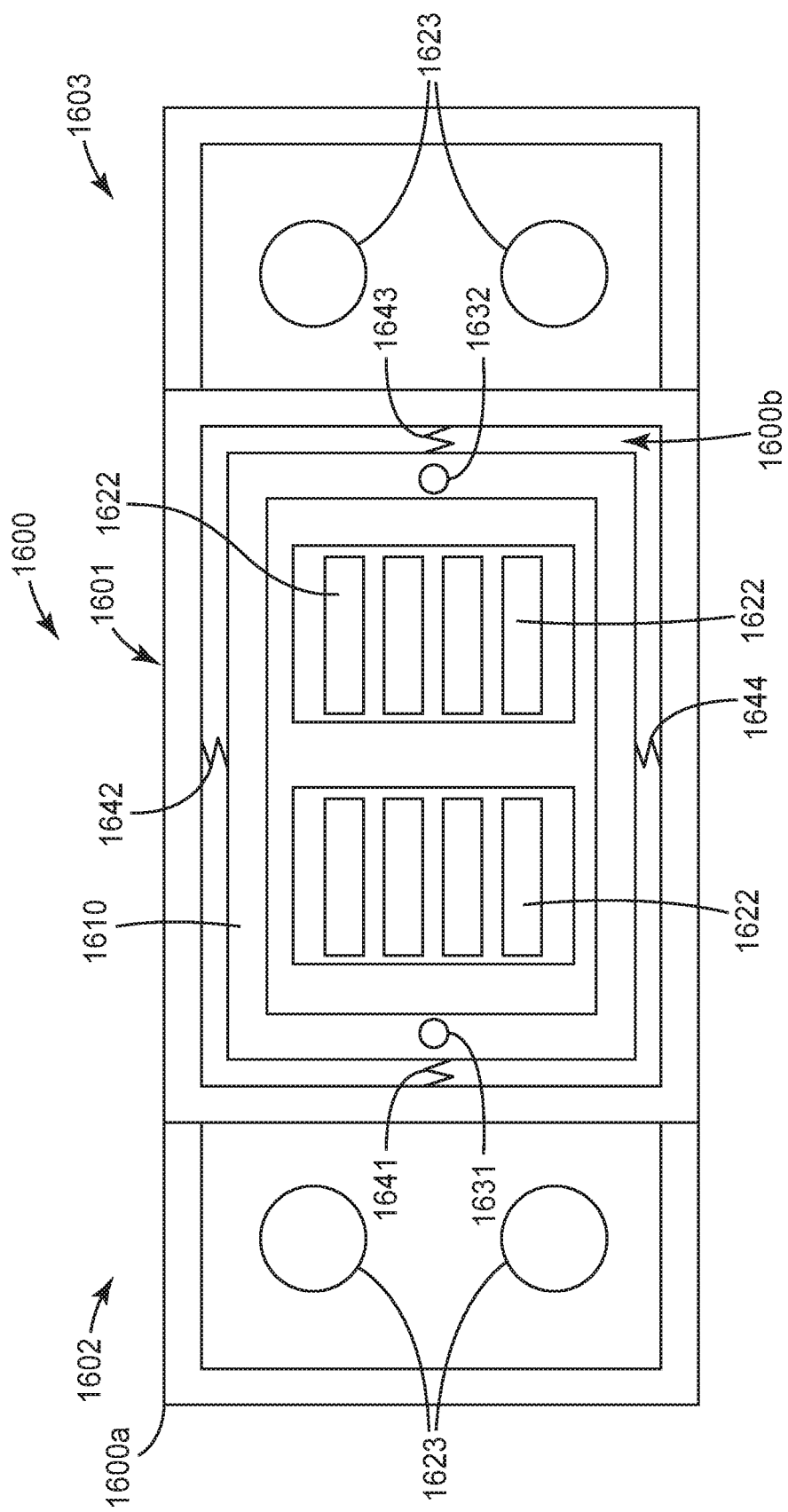
FIG. 16 shows a hybrid connector that includes a floating inner housing for the rotatable connection elements.

FIG. 16 shows a hybrid connector 1600 from the perspective of looking into the mating face of the connector along the mating (x-) axis. Hybrid connector includes a housing 1600a having first section 1601 that at least partially encloses rotatable connection elements, e.g., optical ferrules 1622, and second and third sections 1602, 1603 that at least partially enclose non-rotatable connection elements, e.g., electrical contacts 1623. The rotational connection elements 1622 are disposed within a floating inner housing 1610.

The inner housing 1610 is held within the interior 1600b of the housing 1600a by springs or other compliant features 1641-1644 that allow some amount of translation along and/or rotation around x, y, and/or z axes. Alternatively, the features 1641-1644 that hold the inner housing within the housing 1600a of the hybrid connector may restrict translation along and/or rotation around some axes while allowing translation along and/or rotation around other axes.

In some embodiments, the ferrules 1622 may be held in a fixed position with respect to the inner housing 1610 such that rotation and/or translation of the inner housing 1610 causes the ferrules 1622 to move together and non-independently. Alternatively or additionally, the ferrules 1622 may be held within the inner housing 1610 in a way that allows for independent movement of the ferrules 1622 e.g., independent rotation around the y axis.

Figure 17:
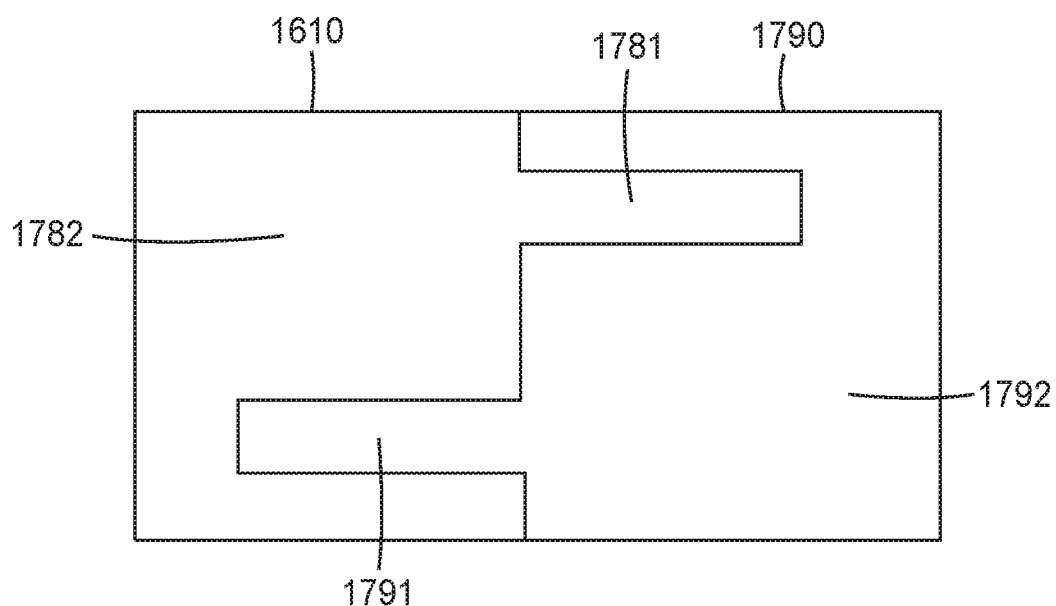
FIG. 17 is a side schematic view of an inner housing that contains rotatable element and that includes flexible alignment arms in accordance with some embodiments.

As shown in FIG. 16, the inner housing 1610 may include alignment features 1631, 1632 that compatibly engage with complementary mating alignment features of a mating connector. The alignment features 1631, 1632 may comprise two pins or two sockets, or may comprise a pin and a socket. Various other types of mechanical alignment features could alternatively be used, e.g. such as arms at the left and right or top and bottom sides of the inner housing as illustrated in FIG. 17. The non-rotatable connection elements 1623 provide lateral (y-) axis alignment and/or vertical (z-) axis alignment of the hybrid connector with a mating connector. The alignment features 1631, 1632 provide for lateral alignment and/or vertical alignment of the inner housing 1610 an inner housing of the mating connector. In some configurations, the housing sections 1601-1603 may be modular having module connecting features, e.g., as shown in FIGS. 13-15 so that the modular sections can be interconnected as hybrid connectors having a variety of configurations.

FIG. 17 shows a side view of an inner housing 1610 mated with a mating inner housing 1790. The inner housing 1610 includes arms 1781 that extend from the left side 1782 and right side (not shown) of the inner housing 1610 and engage with the left side (not shown) and right side 1792 of a mating inner housing 1790. The left and right arms 1791 of the mating connector 1790 extend into the interior 1600b of the housing 1601 (see FIG. 16). Arm 1791 extends from the left side (not shown) and right side 1792 of the mating inner housing 1790 and engage with left side 1782 and right side of the inner housing 1610. In some embodiments, the side arms 1781, 1791 may be flexible.

The material forming the flexible arms 1781, 1791 and/or the geometry of the flexible arms 1781, 1791 can be selected to provide a desired alignment force between inner housing 1610 and the mating inner housing 1790. For example, the alignment force provided by the side arms 1781, 1791 can be increased or decreased by choosing a material for the flexible arms 1781, 1791 with a higher or lower Young's modulus, respectively. Additionally or alternatively, the alignment force provided by the flexible arms 1781, 1791 can be increased or decreased by choosing larger or smaller cross-sectional areas, respectively, for the flexible arms 1781, 1791. Useful alignment forces can be obtained by choosing an injection moldable polymer for both the inner housing 1610, 1790 and the arms 1781, 1791 and by choosing a geometry of the flexible arms 1781, 1791 that can be injection molded along with the inner housing 1610, 1790.

FIGS. 18A through 18E and FIG. 19 illustrate portions of structures that, depending on the configuration, may serve as inner housings, outer housings, and/or floating or semi-floating support structures for a hybrid connector. These structure portions are collectively referred to below as housing portions. For example, in some embodiments a housing portion 1800, 1900 may be an inner housing or a portion of an inner housing (e.g., see FIG. 10) configured to be inserted at least partially into the outer housing of a hybrid connector. Alternatively, the housing portion 1800, 1900 may represent a modular portion of the outer hybrid connector housing. Alternatively the housing portions 1800, 1900 may be used as a floating or semi-floating support structure disposed within an inner or outer connector. The housing portions 1800, 1900 may be modular or non-modular.

Figure 18A:
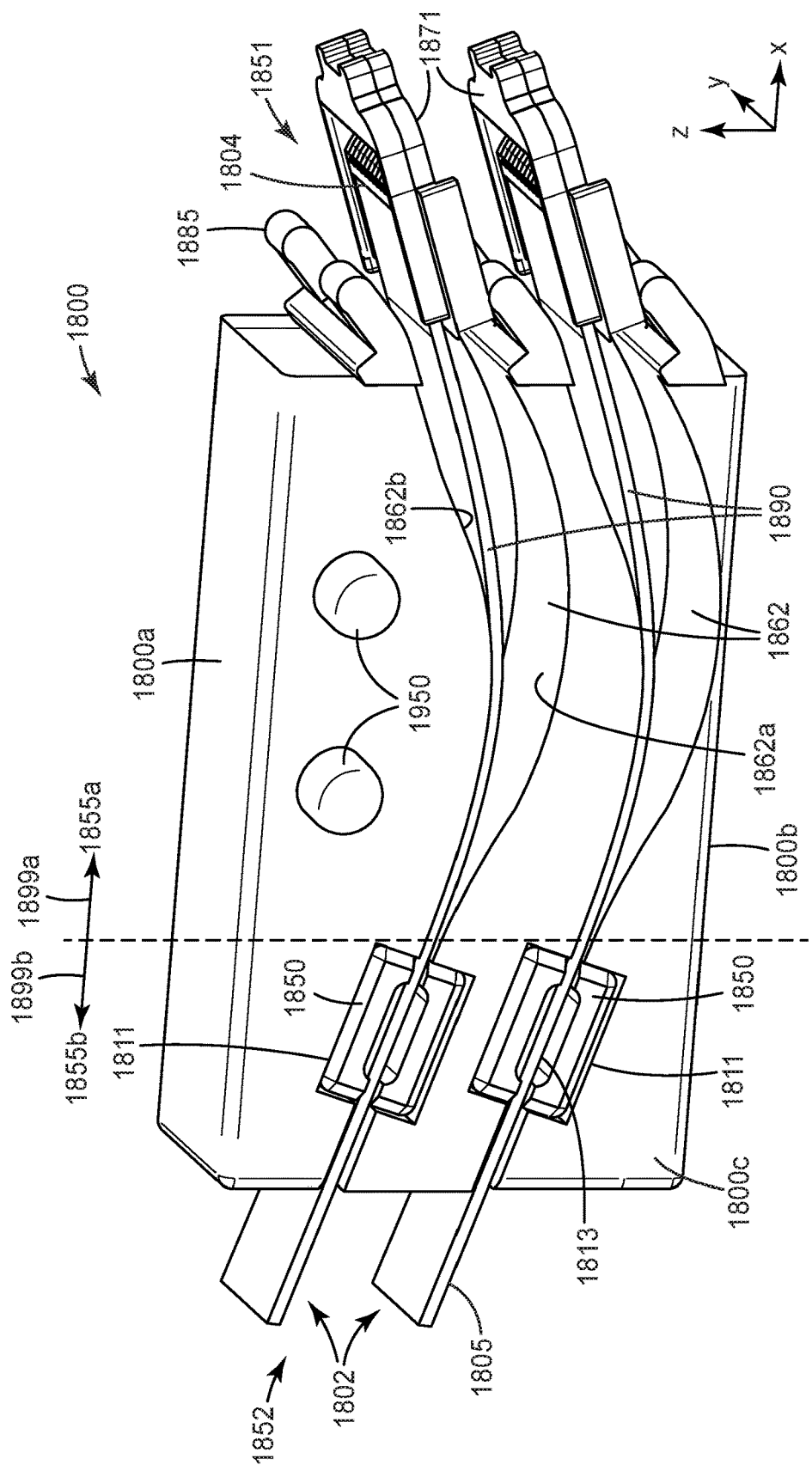
Figure 18D:
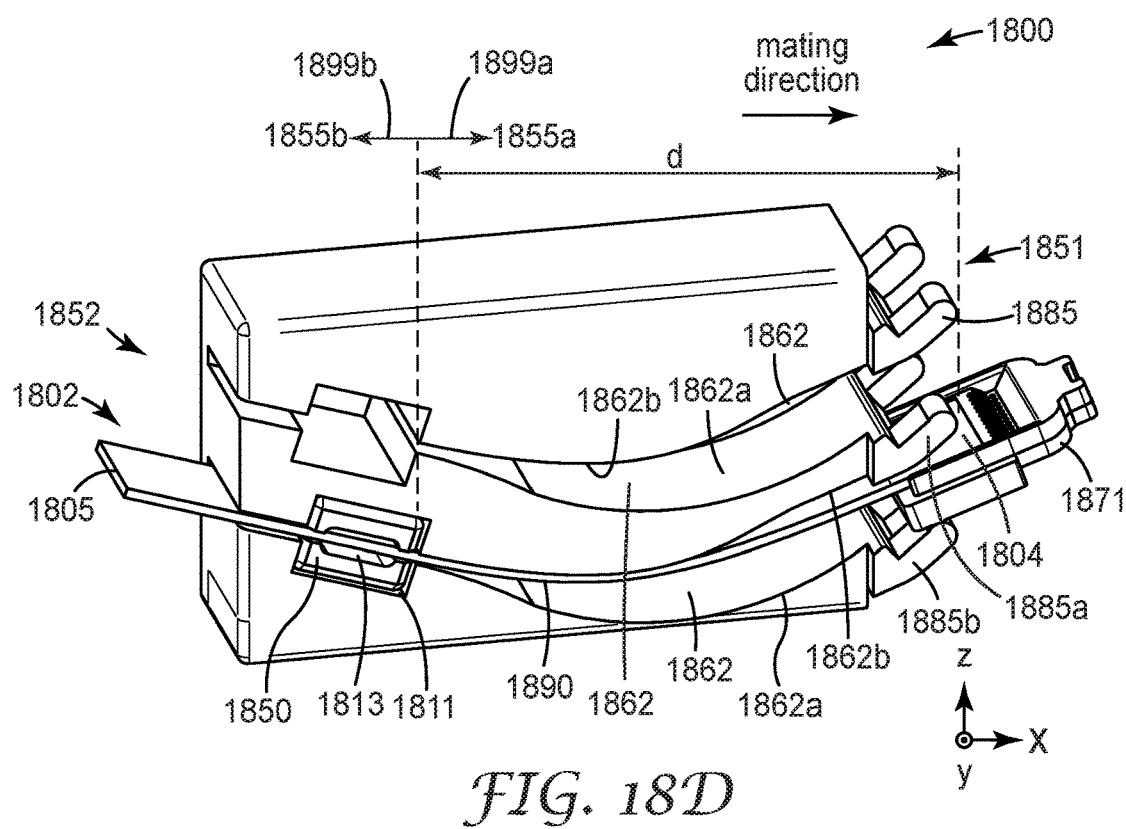
Figure 19:
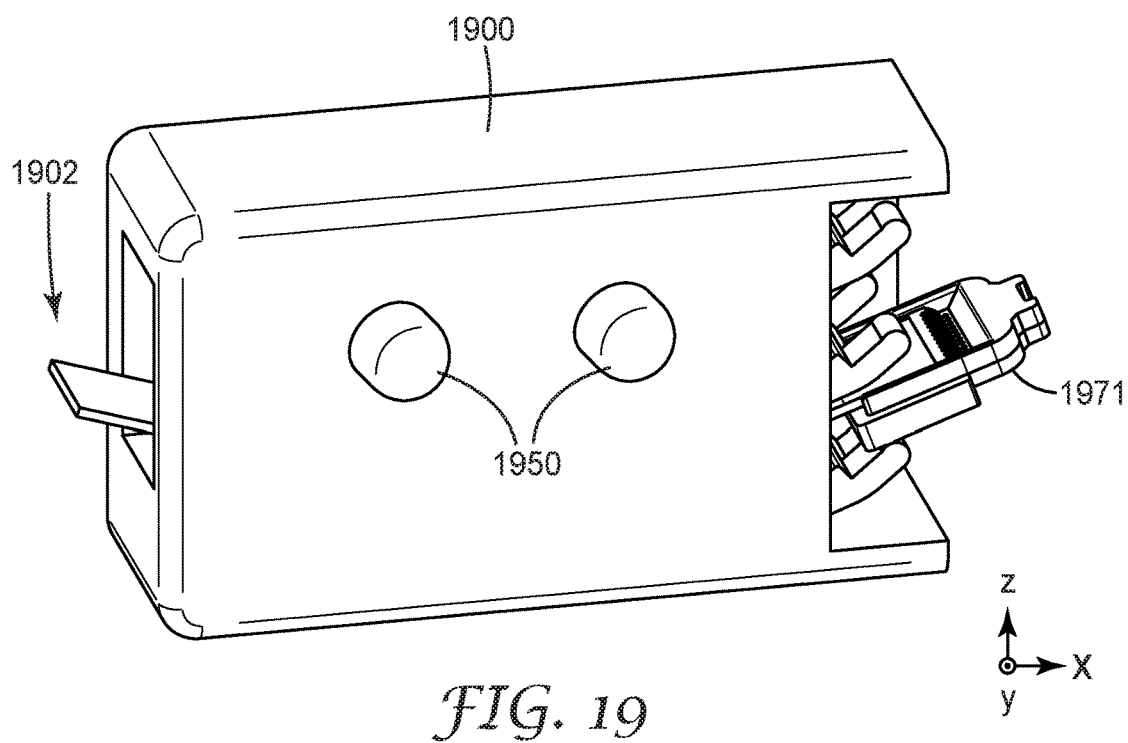
FIG. 19 illustrates a housing portion having solid sidewalls in accordance with some embodiments.

The housing portions 1800, 1900 shown in FIGS. 18 and 19 are particularly useful for housing rotatable connection elements such as optical ferrules. However, in general, each housing portion 1800, 1900 may include rotatable or non-rotatable connection elements. In some configurations, a hybrid connector includes at least one housing portion 1800, 1900 that contains rotatable connection elements and at least another housing portion 1800, 1900 that contains non-rotatable connection elements.

FIGS. 18A through 18E depict a housing portion 1800 configured to hold optical cable subassemblies 1802 comprising optical ferrules 1871 and waveguides 1805 attached thereto at a ferrule attachment area 1804. The housing portion 1800 is open-sided structure wherein at least a portion of the passageways 1862 within the housing portion 1800 are exposed. Portions of cable subassemblies 1802 comprising optical ferrules 1871 and waveguides 1805 are configured to be contained within the passageways 1862 of the housing portion 1800. FIG. 19 depicts a closed-sided housing portion 1900 configured to hold portions of optical cable subassemblies 1902 comprising optical ferrules 1971 and waveguides 1905.

In modular configurations of a hybrid connector, the open-sided housing portion 1800 can allow for higher density packing of optical ferrules and/or other rotatable connection elements when compared to the connection element density achievable using the closed-sided housing portion/ inner housing 1900.

In modular configurations of a hybrid connector, the housing portions 1800, 1900 each include module connecting features, e.g., optional pins 1950 and sockets 1960 located at top 1800a, bottom 1800b, left 1800c and/or right 1800d sidewalls of the housing portion 1800, 1900. The pins 1950 are configured to engage with compatible sockets of a neighboring housing portion and the sockets 1960 are configured to engage with compatible pins of the neighboring housing portion 1800. The module connecting features 1950, 1960 can facilitate one dimensional or two dimensional stacking of the housing portions/inner housings 1800, 1900 in a modular hybrid connector.

Housing portion 1800 includes passageways 1862 that are dimensioned to receive optical cable subassemblies 1802 comprising optical waveguides 1805 attached to optical ferrules 1871 at ferrule attachment area 1804. Housing portion 1800 includes side walls, e.g., top 1800a, bottom 1800b, left 1800c, and right 1800d side walls wherein one or more of the left and right sidewalls 1800c, 1800d is a partial sidewall that exposes at least a portion of the passageways 1862 within the housing portion 1800.

The optical cable subassemblies 1802 shown in FIGS. 18A through 18E each include a cable retainer 1850 attached to the waveguides 1805 of the cable subassembly 1802 at a retainer attachment area 1813. Each passageway 1862 is dimensioned to receive and contain a section of an optical cable subassembly 1802. The passageways 1862 each include a retainer mount 1811 configured to receive the cable retainer 1850. The walls 1862a, 1862b of the passageways 1862 between the retainer mount 1811 and the non-mating end 1852 of the housing portion/inner housing 1800 may be configured to support the optical cable subassembly 1802 while the optical cable subassembly 1802 is in an unmated position or is in a mated position.

Figure 18E:
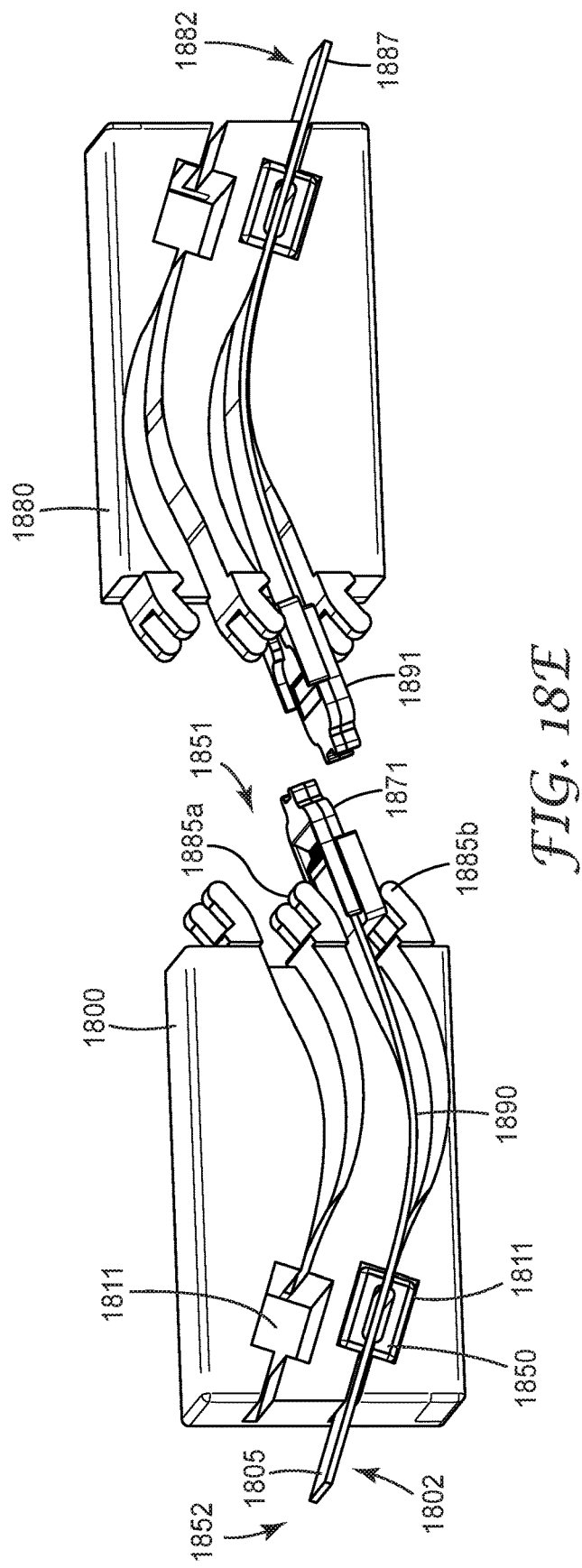

In various embodiments, the passageways 1862 within the housing portion 1800 may have any suitable shape or volume. As shown in FIGS. 18A through 18E and FIG. 19, the walls 1862a, 1862b of the passageways 1862 may be curved. The volume and/or shape of a passageway 1862 is configured to allow the optical waveguides 1805 to develop a predetermined bend 1890 that provides the mating spring force for the optical ferrule 1871. The bend 1890 provides a spring force at the mating angle of the optical ferrule 1871 that maintains the optical ferrule 1871 in optical communication with a mating optical ferrule 1891 when the optical ferrule 1871 is mated with the optical ferrule 1891 of a mating housing portion 1880 as illustrated by FIG. 18E.

The walls 1862a, 1862b of the passageways 1862 may have any convenient shape, and are shown in FIGS. 18A through 18E as curved walls in at least the forward section 1855a of the housing portion 1800. The forward section 1855a is located between the retainer mounts 1811 and the mating end 1851 of the housing portion and is indicated by arrow 1899a The curved walls 1862a, 1862b of passageways 1862 accommodate a gentle-z direction bend 1890 of the optical waveguides 1805. In some implementations, when the optical ferrule 1871 is mated with a mating optical ferrule (see 1891, FIG. 18E), the optical ferrule 1871 and the plurality of optical waveguides 1805 "float" within the passageways 1862 such that neither the optical waveguides 1805 nor the optical ferrule 1871 touch the curved walls 1862a, 1862b or other surfaces of the The housing portion 1800 optionally includes one or more support features 1885a,b located at the mating end 1851 that support the optical waveguides 1805 and/or the optical ferrules 1871 so that the optical ferrules 1871 are in a position for mating. In some embodiments, the position for mating may be angled with respect to the mating direction of the hybrid connector along the x axis as shown in FIG. 18A. An optical ferrule 1871 is in a mating position before it mates with another optical ferrule and after mating the optical ferrule 1871 is a mated position. In some embodiments the mated position is a "floating" mated position such that the optical ferrule 1871 floats above support feature 1885b and below support feature 1885a. In the example illustrated in FIGS. 18A through 18E, the support features 1885a,b comprise dual support arms that extend outwardly from the passageways 1862.

Each retainer mount 1811 is configured to couple with a cable retainer 1850 of an optical cable subassembly 1802. In the embodiment illustrated in FIGS. 18A through 18E, the mating end 1851 includes optical ferrule support features 1885a, 1885b. The section of the housing portion 1800 that includes retainer mounts 1811 and the non-mating end 1852 of the housing portion 1800, indicated by arrow 1899b, is referred to herein as the rear section 1855b of the housing portion 1800. Coupling the cable retainer 1850 to the retainer mount 1811 within the housing portion 1800 fixes the position of the retainer attachment area 1813 of the optical cable subassembly 1802 within the housing portion 1800, or at least fixes the position of the retainer attachment area 1813 within the rear section 1855b of housing portion 1800, when the optical cable subassembly 1802 is in the mated position.

In some embodiments, when the cable retainer 1850 is installed in the retainer mount 1811 and the optical cable subassembly 1802 is in the unmated position, there may be some movement (e.g., along the x and or z axes shown in FIG. 18A) of the cable retainer 1850. When the optical cable subassembly 1802 mates with a compatible optical cable subassembly and is in the mated position, the position of the retainer attachment area 1813 of the optical cable subassembly 1802 is fixed by the interaction of the cable retainer 1850 and the retainer mount 1811. Fixing the position of the retainer attachment area 1813 within the housing portion 1800 provides for developing the bend 1890 and the spring force in the optical waveguides 1805 such that the optical ferrule 1871 in the mated position is able to float. The optical ferrule 1871 and the optical waveguide 1805 are held away from the passageway walls 1862a, 1862b and/or the supports 1885a,b by the spring force of the optical waveguides 1805 and the waveguides 1887 of a mating optical cable subassembly 1882 (as shown in FIG. 18E). In some embodiments, when the cable retainer 1850 is coupled with the retainer mount 1811, the retainer attachment area 1813 may be the only point of attachment of the optical cable subassembly 1802 to the housing portion 1800. In the mated position, the cable retainer 1850 and the retainer mount 1811 support the optical cable subassembly 1870 and attach the optical cable subassembly 1802 to the housing portion 1800, fixing the position of the retainer attachment area 1813 within the housing portion 1800.

As illustrated in FIGS. 18A and 18B, the retainer mount 1811 can be a slot in the passageway 1862 dimensioned to hold the cable retainer 1850 within the housing portion 1800. Although each cable retainer 1850 is illustrated in FIGS. 18A through 18E as being attached to one waveguide array 1805, in some embodiments, a cable retainer may be attached to multiple waveguides or to multiple waveguide arrays.

Figure 20A:
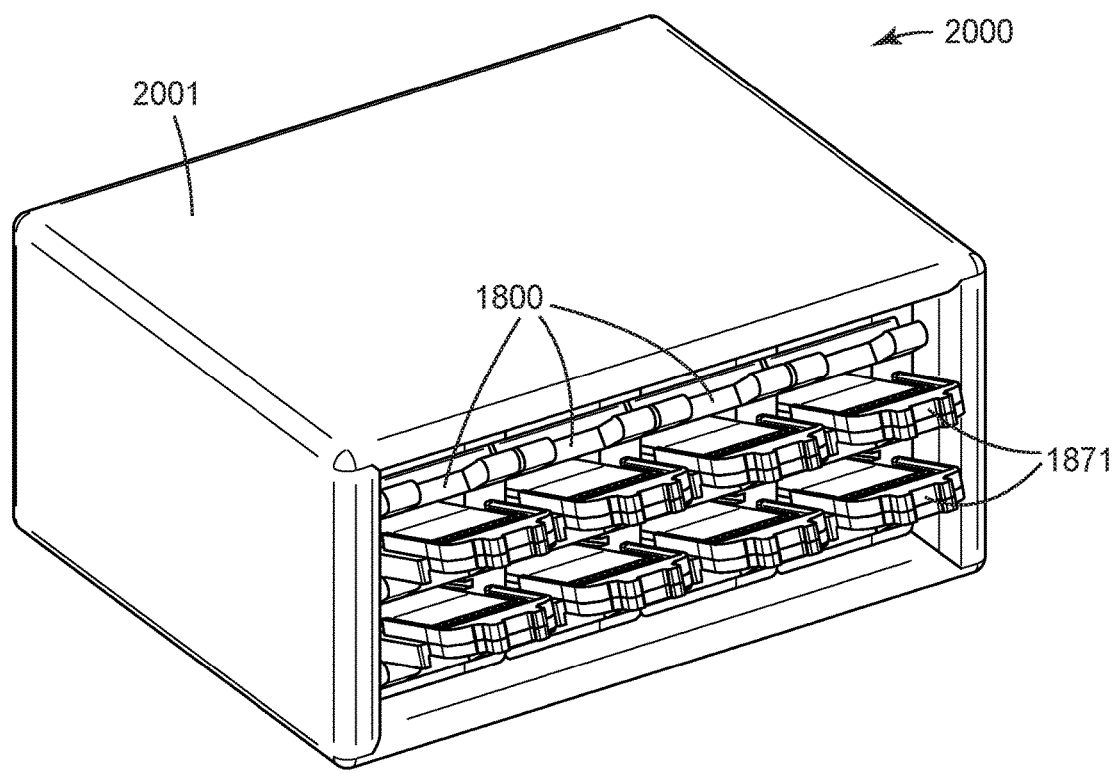
FIGS. 20A and 20B show a portion of a hybrid connector housing configured to contain multiple rotatable elements in accordance with some embodiments.
Figure 20B:
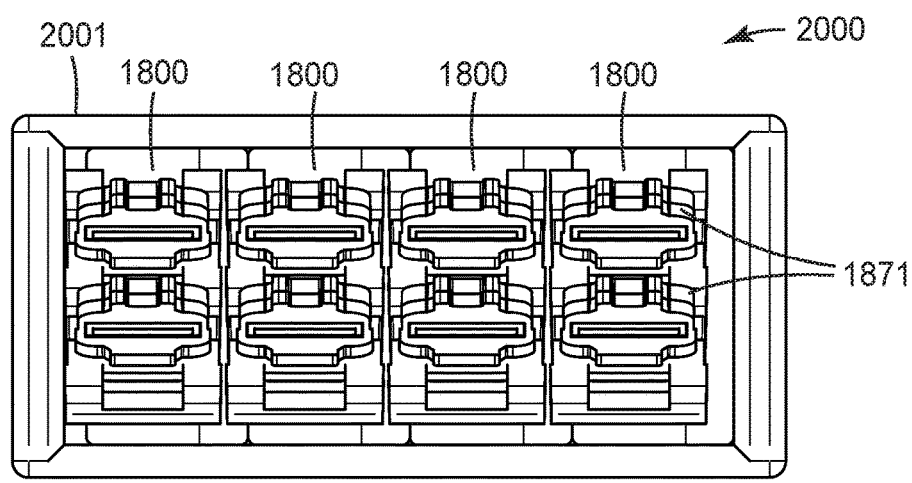

FIGS. 20A and 20B show a portion 2000 of a hybrid connector housing configured to contain multiple rotatable elements, e.g., optical ferrules 1871. The portion 2000 may comprise multiple modular housing portions 1800, e.g., as described in FIGS. 18A through 18E, wherein the modular portions 1800 are stacked along the lateral (y-) axis within an outer housing 2001.

Additional information regarding ferrules, alignment frames, and connectors that may be used in conjunction with the approaches described herein is provided in the following commonly owned and concurrently filed U.S. patent applications which are incorporated herein by reference: U.S. Patent Application Ser. No. 62/239,998, having the title "Connector with Latching Mechanism"; U.S. Patent Application Ser. No. 62/240,069, having the title "Optical Ferrules"; U.S. Patent Application Ser. No. 62/240,066, having the title "Ferrules, Alignment Frames and Connectors,"; U.S. Patent Application Ser. No. 62/240,010, having the title "Optical Coupling Device with Waveguide Assisted Registration,"; U.S. Patent Application Ser. No. 62/240,008, having the title "Optical Cable Assembly with Retainer,"; U.S. Patent Application Ser. No. 62/240,000, having the title "Dust Mitigating Optical Connector,"; U.S. Patent Application Ser. No. 62/240,009, having the title "Optical Waveguide Registration Feature,"; U.S. Patent Application 62/239,996, having the title "Optical Ferrules and Optical Ferrule Molds,"; U.S. Patent Application 62/240,002, having the title "Optical Ferrules with Waveguide Inaccessible Space,"; and U.S. Patent Application 62/240,003, having the title "Configurable Modular Connectors,".

Items included in this disclosure include:

Item 1. A hybrid connector, comprising:
a connector housing;
one or more first connection elements configured to transfer a first type of energy or a fluid; and
one or more second connection elements configured to transfer a second type of energy, different from the first type of energy, or the fluid, wherein the first connection elements are rotationally fixed and the second connection elements are configured to rotate around an axis that is substantially perpendicular to a mating axis of the housing.

Item 2. The connector of item 1, wherein the first type of energy or matter is one of electrical current, light, or fluid and the second type of energy or matter is another of electrical current, light, or fluid.

Item 3. The connector of any of items 1 through 2, wherein the second connection elements are mechanically coupled so that the second connection elements rotate together.

Item 4. The connector of any of items 1 through 3, wherein each second connection element is configured to rotate independently of other second connection elements.

Item 5. The connector of any of items 1 through 4, wherein:
the first connection elements are electrical connection elements; and
the second connection elements are optical connection elements.

Item 6. The connector of any of items 1 through 4, wherein:
the first connection elements are fluidic connection elements; and
the second connection elements are optical connection elements.

Item 7. The connector of item 1, wherein the first connection elements and the second connection elements are configured such that when the connector mates with a mating connector, the first connection elements become connected with corresponding first connection elements of the mating connector before the second connection elements become connected with corresponding second connection elements of the mating connector and the first connection elements remain connected with the corresponding first connection elements of the mating connector after the second connection elements are connected with the corresponding second connection elements of the mating connector.

Item 8. The connector of item 7, wherein the second connection elements rotate during mating.

Item 9. The connector of item 8, wherein, after the second connection elements are connected with the corresponding second connection elements of the mating connector, further mating is mechanically limited by a mechanical stop feature.

Item 10. The connector of item 8, wherein:
the first connection elements are electrical connection elements coupled to electrical wires;
the second connection elements are optical connection elements supported by optical waveguides; and
the further mating is mechanically limited before the optical waveguides exceed a predetermined bend radius.

Item 11. The connector of any of items 1 through 10, wherein when the connector mates with a mating connector, the first connection elements laterally align the connector with the mating connector.

Item 12. The connector of an of items 1 through 11, further comprising:
an inner housing disposed at least partially within the connector housing, wherein the second connection elements are disposed in the inner housing.

Item 13. A hybrid connector, comprising:
a housing;
one or more first connection elements disposed at least partially within the housing and configured to transfer a first type of energy or a fluid; and
one or more second connection elements disposed at least partially within the housing and configured to transfer a second type of energy different from the first type of energy or the fluid, wherein the first connection elements are rotationally fixed in the housing and the second connection elements are configured to rotate around an axis that is substantially perpendicular to a mating axis of the housing, and wherein the first connection elements are configured to engage with corresponding first connection elements of a mating connector before the second connection elements engage with corresponding second connection elements of the mating connector, wherein engagement of the first connection elements with the corresponding first connection elements provides one of both of lateral and vertical alignment for engagement of the second connection elements.

Item 14. A hybrid connector, comprising:
a housing that includes a passageway;
one or more first connection elements, each first connection element rotationally fixed and configured for attachment to a first energy conductor;
one or more second connection elements, each second connection element configured to rotate, each second connection element supported by and attached to one or more second energy conductors at a first attachment area;
one or more cable retainers comprising a second attachment area for attaching to the second energy conductors; and
a retainer mount disposed within the housing and configured to engage with the cable retainer such that a position of second attachment area is fixed within the housing, the passageway dimensioned to constrain the second energy conductors to bend within the housing between the first attachment area and the second attachment area.

Item 15. The connector of item 14, wherein the first connection elements are configured to transfer a first type of energy or fluid between the connector and a mating connector and the second connection elements are configured to transfer a second type of energy, different from the first type of energy, or the fluid between the connector and the mating connector.

Item 16. The connector of any of items 14 through 15, wherein the second connection elements are optical ferrules and the second energy conductors are optical waveguides.

Item 17. The connector of item 16, wherein each optical ferrule is supported by multiple optical waveguides.

Item 18. The connector of any of items 14 through 17, wherein the second connection elements, the second energy conductors that support the second connection elements and the cable retainer attached to the second energy conductors form a subassembly that is adapted to be installed in and subsequently removed from the housing without damage to the housing or the subassembly.

Item 19. The connector of any of items 14 through 18, wherein the housing comprises an inner housing and the hybrid connector further comprises an outer housing, the inner housing disposed at least partially within the outer housing.

Item 20. The connector of any of items 14 through 19, wherein a length of the second energy conductors between the first attachment area and the second attachment area is configured to allow a bend in the second energy conductors that provides a predetermined mating spring force at a predetermined angle of second connection elements.

Item 21. The connector of any of items 14 through 20, wherein engagement of the cable retainer and the retainer mount provides the only attachment of the second energy conductors to the housing between the cable retainer and the second connection elements.

Item 22. The connector of any of items 14 through 21, wherein a position of the second attachment area within the housing is fixed, the second connection elements and the first attachment area are configured to move within the housing relative to the fixed position of the second attachment area, and a length of the second energy conductors between the first attachment area and the second attachment area allows the conductors to bend within the housing as the first attachment area moves relative to the second attachment area.

Item 23. The connector of any of items 14 through 22, wherein a position of the second attachment area within the connector housing is fixed, a length of the second energy conductors between the first attachment area and the second attachment area is greater than a straight-line distance between the first attachment area and the second attachment area after the second energy conductors are installed in the housing.

Item 24. The connector of any of items 14 through 23, wherein the first connection elements and the second connection elements are configured such that when the connector mates with a mating connector, the first connection elements become connected with corresponding first connection elements of the mating connector before the second connection elements are become connected with corresponding second connection elements of the mating connector and the first connection elements provide one or both of lateral and vertical alignment for mating the second connection elements of the connector with second connection elements of the mating connector.

Item 25. The connector of item 24, wherein after the second connection elements are connected with the corresponding second connection elements of the mating connector further mating is mechanically limited.

Item 26. The connector of item 24, wherein:
the first connection elements are electrical contacts coupled to electrical wires;
the second connection elements are optical ferrules supported by optical waveguides; and
the further mating is mechanically limited before the optical waveguides exceed a predetermined bend radius.

Item 27. The connector of item 24, wherein:
the first connection elements are fluidic couplings;
the second connection elements are optical ferrules supported by optical waveguides; and
the further mating is mechanically limited before the optical waveguides exceed a predetermined bend radius.

Item 28. A modular hybrid connector comprising:
a plurality of modules including at least a first module and a second module,
the first module comprising:
a first module housing that includes module connecting elements configured to connect the first module with a neighboring second module; and
first connection elements rotationally fixed and at least partially disposed within the first module housing, the first connection elements configured to transfer a first type of energy or a fluid to a mating connector; and the second module comprising:
a second module housing that includes module connecting elements configured to engage with the modular connecting features of the first module housing; and
second connection elements at least partially disposed within the first module housing, the second connection elements configured to rotate around an axis perpendicular to a mating axis of the hybrid connector, the second connection elements configured to transfer a second type of energy, different from the first type of energy, or the fluid to the mating connector.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. A hybrid connector, comprising:
a connector housing;
one or more first connection elements configured to transfer a first type of energy or to transfer a fluid; and
a plurality of second connection elements configured to transfer a second type of energy, different from the first type of energy, or to transfer the fluid, each second connection element configured to receive a plurality of energy conductors extending along a first direction and arranged along an orthogonal second direction, the second directions of the second connection elements being substantially parallel to one another, wherein the first connection elements are rotationally fixed and the second connection elements are configured to rotate around an axis that is substantially perpendicular to a mating axis of the housing.

2. The connector of claim 1, wherein the second connection elements are mechanically coupled so that the second connection elements rotate together.

3. The connector of claim 1, wherein each second connection element is configured to rotate independently of other second connection elements.

4. The connector of claim 1, wherein:
the first connection elements are electrical connection elements; and
the second connection elements are optical connection elements.

5. The connector of claim 1, wherein the first connection elements and the second connection elements are configured such that when the connector mates with a mating connector, the first connection elements become connected with corresponding first connection elements of the mating connector before the second connection elements become connected with corresponding second connection elements of the mating connector and the first connection elements remain connected with the corresponding first connection elements of the mating connector after the second connection elements are connected with the corresponding second connection elements of the mating connector.

6. The connector of claim 5, being configured such that when the connector mates with a mating connector, the second connection elements rotate.

7. The connector of claim 6, wherein:
the first connection elements are electrical connection elements coupled to electrical wires;
the second connection elements are optical connection elements supported by optical waveguides; and
the further mating is mechanically limited before the optical waveguides exceed a predetermined bend radius.

8. The connector of claim 1, wherein when the connector mates with a mating connector, the first connection elements laterally align the connector with the mating connector.

9. A hybrid connector, comprising:
a housing that includes a passageway;
one or more first connection elements, each first connection element rotationally fixed and configured for attachment to a first energy conductor;
one or more second connection elements, each second connection element configured to rotate, each second connection element supported by and attached to one or more second energy conductors at a first attachment area;
one or more cable retainers comprising a second attachment area for attaching to the second energy conductors; and
one or more retainer mounts disposed within the housing, each retainer mount configured to receive a corresponding cable retainer in the one or more cable retainers along a direction substantially orthogonal to a mating direction of the hybrid connector, the retainer mount configured to engage with the cable retainer such that a position of second attachment area is fixed within the housing, the passageway dimensioned to constrain the second energy conductors to bend within the housing between the first attachment area and the second attachment area.

10. The connector of claim 9, wherein the first connection elements are configure to transfer a first type of energy or fluid between the connector and a mating connector and the second connection elements are configured to transfer a second type of energy, different from the first type of energy, or the fluid between the connector and the mating connector.

11. The connector of claim 9, wherein the second connection elements are optical ferrules and the second energy conductors are optical waveguides.

12. The connector of claim 9, wherein the second connection elements, the second energy conductors that support the second connection elements and the cable retainer attached to the second energy conductors form a subassembly that is adapted to be installed in and subsequently removed from the housing without damage to the housing or the subassembly.

13. The connector of claim 9, wherein the housing comprises an inner housing and the hybrid connector further comprises an outer housing, the inner housing disposed at least partially within the outer housing.

14. The connector of claim 9, wherein a length of the second energy conductors between the first attachment area and the second attachment area is configured to allow a bend in the second energy conductors that provides a predetermined mating spring force at a predetermined angle of second connection elements.

15. The connector of claim 9, wherein a position of the second attachment area within the housing is fixed, the second connection elements and the first attachment area are configured to move within the housing relative to the fixed position of the second attachment area, and a length of the second energy conductors between the first attachment area and the second attachment area allows the conductors to bend within the housing as the first attachment area moves relative to the second attachment area.

16. The connector of claim 9, wherein a position of the second attachment area within the connector housing is fixed, a length of the second energy conductors between the first attachment area and the second attachment area is greater than a straight-line distance between the first attachment area and the second attachment area after the second energy conductors are installed in the housing.

17. The connector of claim 9, wherein the first connection elements and the second connection elements are configured such that when the connector mates with a mating connector, the first connection elements become connected with corresponding first connection elements of the mating connector before the second connection elements become connected with corresponding second connection elements of the mating connector and the first connection elements provide one or both of lateral and vertical alignment for mating the second connection elements of the connector with second connection elements of the mating connector.

18. The connector of claim 17, wherein:
the first connection elements are electrical contacts coupled to electrical wires;
the second connection elements are optical ferrules supported by optical waveguides; and
after the second connection elements are connected with the corresponding second connection elements of the mating connector, further mating is mechanically limited before the optical waveguides exceed a predetermined bend radius.

19. The connector of claim 17, wherein:
the first connection elements are fluidic couplings;
the second connection elements are optical ferrules supported by optical waveguides; and
after the second connection elements are connected with the corresponding second connection elements of the mating connector, further mating is mechanically limited before the optical waveguides exceed a predetermined bend radius.

20. A modular hybrid connector comprising:
a plurality of modules including at least a first module and a second module,
the first module comprising:
a first module housing that includes module connecting features configured to connect the first module with a neighboring second module; and
first connection elements rotationally fixed and at least partially disposed within the first module housing, the first connection elements configured to transfer a first type of energy or to transfer a fluid to a mating connector; and
the second module comprising:
a second module housing that includes module connecting features configured to engage with the module connecting features of the first module housing; and
second connection elements at least partially disposed within the second module housing, the second connection elements configured to rotate around an axis perpendicular to a mating axis of the modular hybrid connector, the second connection elements configured to transfer a second type of energy, different from the first type of energy, or to transfer the fluid to the mating connector.

* * * * *

UNITED STATES PATENT AND TRADEMARK OFFICE
CERTIFICATE OF CORRECTION

PATENT NO. : 10,288,816 B2
APPLICATION NO. : 15/763136
DATED : May 14, 2019
INVENTOR(S) : Terry Smith et al.

It is certified that error appears in the above-identified patent and that said Letters Patent is hereby corrected as shown below:

In the Specification

Column 9
Line 67, Delete "they" and insert -- the y --, therefor.

Column 14
Line 15, Delete "1899a" and insert -- 1899a. --, therefor.

Column 14
Line 23, After "1862a, 1862b or other surfaces of the" insert -- passageways. --, therefor.

Column 14
Line 59, Delete "and or" and insert -- and/or --, therefor.

Column 15
Line 39, Delete "Mechanism";" and insert -- Mechanism" and identified by Attorney Docket Number 76663US002; --, therefor.

Column 15
Line 40-41, Delete "Ferrules";" and insert -- Ferrules" and identified by Attorney Docket Number 76982US002; --, therefor.

Column 15
Line 42, Delete "Connectors,";" and insert -- Connectors," and identified by Attorney Docket Number 75767US002; --, therefor.

Column 15
Line 44-45, Delete "Registration,";" and insert -- Registration," identified by Attorney Docket Number 76660US002; --, therefor.

Signed and Sealed this
Twenty-sixth Day of November, 2019

Andrei Iancu
*Director of the United States Patent and Trademark Office*

Column 15
Line 46, Delete "Retainer,";" and insert -- Retainer," identified by Attorney Docket Number 76662US002; --, therefor.

Column 15
Line 48, Delete "Connector,";" and insert -- Connector," identified by Attorney Docket Number 76664US002; --, therefor.

Column 15
Line 50, Delete "Feature,";" and insert -- Feature," identified by Attorney Docket Number 76661US002; --, therefor.

Column 15
Line 52, Delete "Molds,";" and insert -- Molds," identified by Attorney Docket Number 75985US002; --, therefor.

Column 15
Line 54, Delete "Space,";" and insert -- Space," identified by Attorney Docket Number 76778US002; --, therefor.

Column 15
Line 55, Delete "Connectors,"" and insert -- Connectors," identified by Attorney Docket Number 76907US002. --, therefor.

In the Claims

Column 20
Line 10, In Claim 6, Delete "claim 5," and insert -- claim 5 --, therefor.

Column 20
Line 49, In Claim 10, delete "configure" and insert -- configured --, therefor.